United States Patent
Sakai et al.

(10) Patent No.: US 11,659,439 B2
(45) Date of Patent: May 23, 2023

(54) INFORMATION PROCESSING APPARATUS, COMMUNICATION SYSTEM, INFORMATION PROCESSING METHOD, AND PROGRAM

(71) Applicant: SONY CORPORATION, Tokyo (JP)

(72) Inventors: Eisuke Sakai, Tokyo (JP); Yusuke Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/777,425

(22) PCT Filed: Sep. 21, 2016

(86) PCT No.: PCT/JP2016/077798
§ 371 (c)(1),
(2) Date: May 18, 2018

(87) PCT Pub. No.: WO2017/094331
PCT Pub. Date: Jun. 8, 2017

(65) Prior Publication Data
US 2018/0338266 A1   Nov. 22, 2018

(30) Foreign Application Priority Data

Nov. 30, 2015  (JP) .............................. JP2015-233003

(51) Int. Cl.
*H04W 28/06* (2009.01)
*H04W 84/12* (2009.01)
(Continued)

(52) U.S. Cl.
CPC ......... *H04W 28/065* (2013.01); *H04L 1/1614* (2013.01); *H04L 1/1621* (2013.01);
(Continued)

(58) Field of Classification Search
None
See application file for complete search history.

(56) References Cited

U.S. PATENT DOCUMENTS 4,841,526 A * 6/1989 Wilson ............... H04B 7/18582
                                                    714/708
5,717,689 A    2/1998 Ayanoglu
(Continued)

FOREIGN PATENT DOCUMENTS

CN   1735089 A    2/2006
CN   103081394 A  5/2013
(Continued)

OTHER PUBLICATIONS

ISO/IEC/IEEE International Standard—Information technology—Telecommunications and information exchange between systems Local and metropolitan area networks—Specific requirements Part 11: Wireless LAN Medium Access Control (MAC) and Physical Layer (PHY) Specifications, pp. 1-2798, Nov. 21, 2012 (Year: 2012).*

(Continued)

*Primary Examiner* — Ayaz R Sheikh
*Assistant Examiner* — Tarell A Hampton
(74) *Attorney, Agent, or Firm* — Xsensus, LLP

(57) ABSTRACT

A communication system includes a first information processing apparatus and a second information processing apparatus. The first information processing apparatus controls to determine an information amount to be used for a receipt acknowledgment response to packets to be transmitted to a second information processing apparatus on the basis of information relating to the packets and notifies the second information processing apparatus of that determined information amount. The second information processing apparatus controls to return the receipt acknowledgment response to the packets transmitted from the first informa- (Continued)

tion processing apparatus to the first information processing apparatus on the basis of the information amount notified from the first information processing apparatus.

17 Claims, 16 Drawing Sheets

(51) Int. Cl.
| | |
|---|---|
| H04W 28/04 | (2009.01) |
| H04L 1/18 | (2006.01) |
| H04L 1/16 | (2006.01) |
| H04L 1/1867 | (2023.01) |
| H04L 1/1607 | (2023.01) |

(52) U.S. Cl.
CPC .......... *H04L 1/1896* (2013.01); *H04W 28/04* (2013.01); *H04W 28/06* (2013.01); *H04W 84/12* (2013.01)

(56) References Cited

U.S. PATENT DOCUMENTS

| | | | | |
|---|---|---|---|---|
| 6,105,064 | A * | 8/2000 | Davis | H04L 47/10 709/224 |
| 6,301,249 | B1 * | 10/2001 | Mansfield | H04L 1/1635 370/394 |
| 8,665,906 | B1 * | 3/2014 | Liu | H04B 7/0617 370/473 |
| 9,788,288 | B2 * | 10/2017 | Linsky | H04W 52/48 |
| 2002/0163888 | A1 * | 11/2002 | Grinfeld | H04L 47/10 370/235 |
| 2005/0271019 | A1 * | 12/2005 | Yuan | H04W 74/0816 370/338 |
| 2006/0034174 | A1 * | 2/2006 | Nishibayashi | H04L 1/1642 370/235 |
| 2006/0034247 | A1 | 2/2006 | Gu et al. | |
| 2006/0034277 | A1 * | 2/2006 | Jang | H04L 1/1614 370/389 |
| 2006/0048034 | A1 * | 3/2006 | Cho | H04L 1/1614 714/749 |
| 2006/0083233 | A1 * | 4/2006 | Nishibayashi | H04L 1/1621 370/389 |
| 2006/0092871 | A1 | 5/2006 | Nishibayashi et al. | |
| 2006/0146705 | A1 * | 7/2006 | Waxman | H04W 28/22 370/230 |
| 2007/0127424 | A1 * | 6/2007 | Kwon | H04L 1/1614 370/338 |
| 2007/0186134 | A1 | 8/2007 | Singh | |
| 2008/0212612 | A1 * | 9/2008 | Singh | H04L 1/1614 370/474 |
| 2008/0287069 | A1 * | 11/2008 | Yoshimura | H04L 1/0073 455/69 |
| 2009/0067396 | A1 * | 3/2009 | Fischer | H04L 1/1854 370/338 |
| 2009/0086696 | A1 * | 4/2009 | Naito | H04L 1/0003 370/338 |
| 2009/0109884 | A1 * | 4/2009 | Kwon | H04L 1/007 370/310 |
| 2010/0002646 | A1 | 1/2010 | Nishibayashi | |
| 2010/0008381 | A1 | 1/2010 | Jang | |
| 2011/0261754 | A1 * | 10/2011 | Trainin | H04W 76/11 370/328 |
| 2012/0014335 | A1 * | 1/2012 | Adachi | H04W 48/08 370/329 |
| 2012/0207087 | A1 * | 8/2012 | Wentink | H04L 1/1614 370/328 |
| 2013/0094437 | A1 * | 4/2013 | Bhattacharya | H04L 1/1614 370/328 |
| 2013/0121286 | A1 * | 5/2013 | Trainin | H04L 1/1621 370/329 |
| 2013/0170345 | A1 * | 7/2013 | Merlin | H04L 1/0029 370/230 |
| 2013/0223345 | A1 * | 8/2013 | Asterjadhi | H04L 69/04 370/328 |
| 2013/0301523 | A1 * | 11/2013 | Asterjadhi | H04W 28/06 370/328 |
| 2013/0343275 | A1 * | 12/2013 | Merlin | H04L 1/0007 370/328 |
| 2015/0055639 | A1 * | 2/2015 | Park | H04B 7/2612 370/338 |
| 2015/0092652 | A1 * | 4/2015 | Ramamurthy | H04W 72/005 370/312 |
| 2015/0146648 | A1 * | 5/2015 | Viger | H04L 1/1621 370/329 |
| 2015/0146699 | A1 * | 5/2015 | Wentink | H04L 5/0055 370/336 |
| 2015/0236822 | A1 * | 8/2015 | Pirskanen | H04L 1/1812 370/329 |
| 2015/0295680 | A1 * | 10/2015 | Othman | H04L 1/1614 370/329 |
| 2016/0248569 | A1 * | 8/2016 | Ghosh | H04L 1/1621 |
| 2016/0278081 | A1 * | 9/2016 | Chun | H04L 5/0007 |
| 2017/0055300 | A1 * | 2/2017 | Pitchaiah | H04L 1/1621 |
| 2017/0093547 | A1 * | 3/2017 | Merlin | H04L 5/0055 |
| 2017/0111951 | A1 * | 4/2017 | Chu | H04L 1/1614 |
| 2017/0201343 | A1 * | 7/2017 | Merlin | H04L 43/0894 |
| 2017/0289844 | A1 * | 10/2017 | Son | H04W 28/06 |
| 2017/0331587 | A1 * | 11/2017 | Kim | H04L 5/0055 |
| 2018/0041917 | A1 * | 2/2018 | Xi | H04B 7/0404 |
| 2018/0175991 | A1 * | 6/2018 | Son | H04L 29/08 |
| 2018/0227938 | A1 * | 8/2018 | Lee | H04L 5/00 |
| 2019/0036651 | A1 * | 1/2019 | Chitrakar | H04L 1/1614 |

FOREIGN PATENT DOCUMENTS

| | | |
|---|---|---|
| EP | 2873184 A1 | 5/2015 |
| EP | 2873184 B1 | 8/2016 |
| JP | 9-130407 A | 5/1997 |
| JP | 2006-54673 A | 2/2006 |
| JP | 2006-129393 A | 5/2006 |
| JP | 2006-217242 A | 8/2006 |
| JP | 2008-510351 A | 4/2008 |
| JP | 2008-511243 A | 4/2008 |
| JP | 2013542632 A | 11/2013 |
| JP | 2015-508981 A | 3/2015 |

OTHER PUBLICATIONS

Heng Liu and Yan Wang, "An efficient software/hardware architecture for the IEEE 802.11n block ACK mechanism," 2008 IEEE Singapore International Conference on Communication Systems, 2008, pp. 1111-1114 (Year: 2008).*
European Search Report dated Oct. 16, 2018, issued in corresponding European Patent Application No. 16870271.0.
International Search Report dated Dec. 6, 2016, in PCT/JP2016/077798, filed Sep. 21, 2016.
IEEE Computer Society, "Part 11: Wireless LAN Medium Access Control (MAC) and Physical Layer (PHY) Specifications", IEEE Std 802.11-2012, 2012.
Office Action dated Jan. 27, 2021, issued in corresponding Chinese Application No. 201680069859.5, 18 pages, with English Translation.
«« IEEE 802.11-15/1053 URL: https://mentor.ieee.org/802.11/dcn/15/11-15-1053-01-00ax-multiuser-block-ack 20150911, Guoqinq Li (Apple) "Multiuser Block ACK Request (MU-BAR)".
«« IEEE 802.11-15/1330r0 URL:https://mentor.ieee.org/802.11/dcn/15/11-15-1330-00-00ax-a-method-of-transmitting-multi-sta-block-fra me.pptx, 20151108,jongki Kim LGElectronics) "A method of transmitting Multi-STA block frame".

* cited by examiner

FIG. 2
COMPARATIVE EXAMPLE IN CASE OF USING Immediate Block ACK
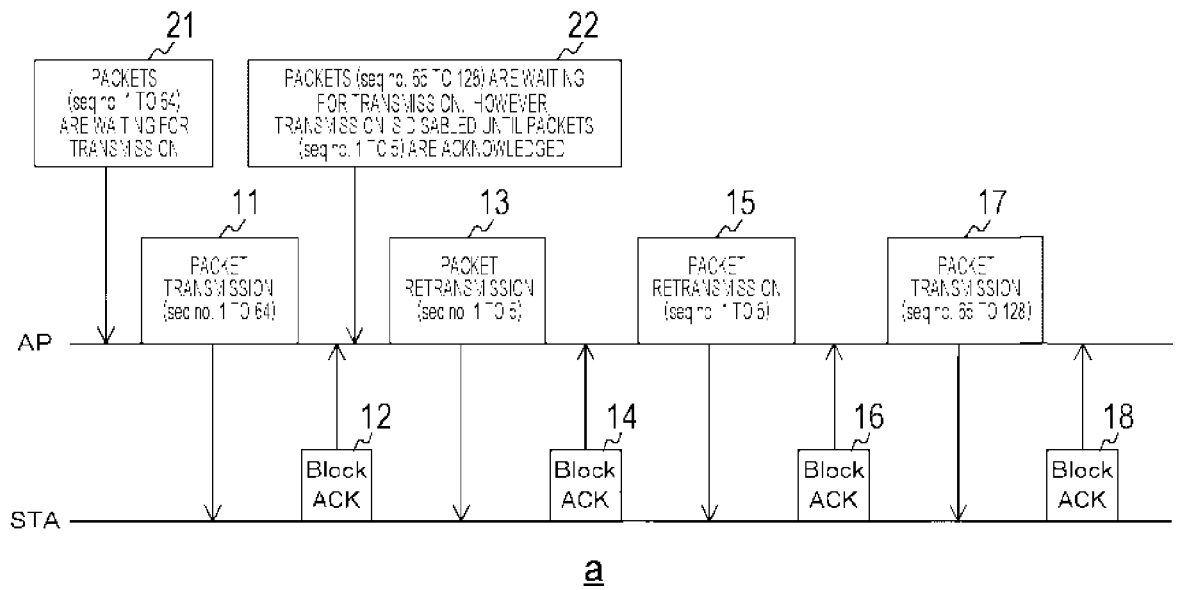
a
COMPARATIVE EXAMPLE IN CASE OF USING Delayed Block ACK
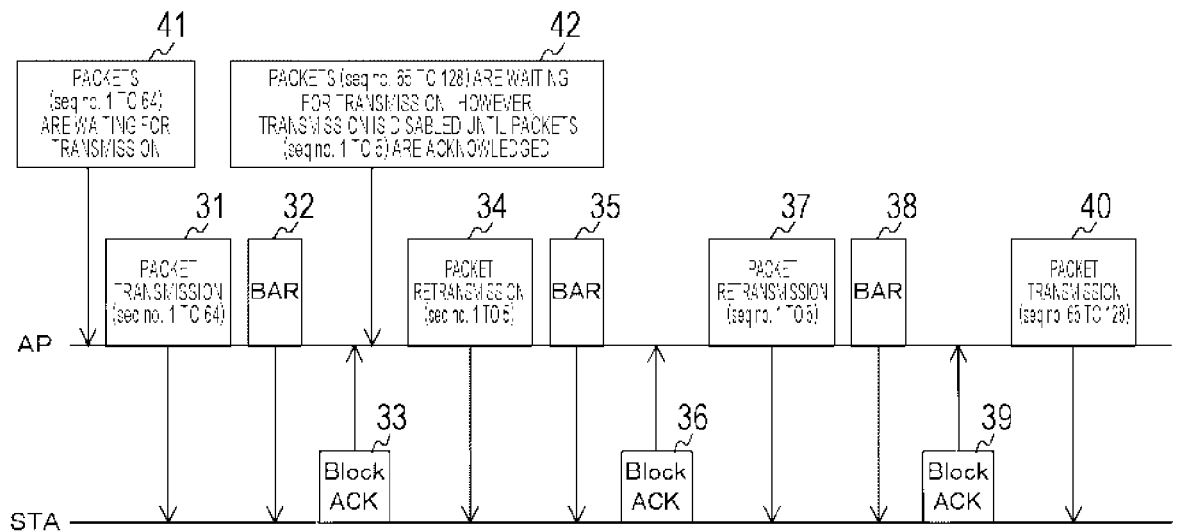
b FIG. 3
EXAMPLE OF FORMAT OF FRAME
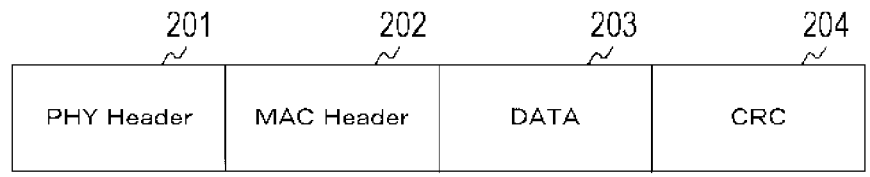
a
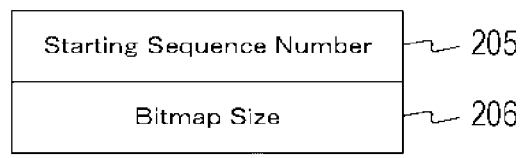
b EXAMPLE OF FORMAT OF Block ACK FRAME

EXAMPLE OF DETERMINING SIZE OF BA BITMAP IN ADDBA SEQUENCE

EXAMPLE OF NOTIFYING BITMAP SIZE USING ACCOMPANYING INFORMATION

EXAMPLE OF DYNAMICALLY DETERMINING BITMAP SIZE AS ADDITIONAL INFORMATION ON DATA FRAME

EXAMPLE OF ACTION OF INFORMATION PROCESSING APPARATUS ON RECEIVING SIDE
(EXAMPLE OF DETERMINING WHETHER TO COMPRESS BA BITMAP TO TRANSMIT)

INFORMATION PROCESSING APPARATUS, COMMUNICATION SYSTEM, INFORMATION PROCESSING METHOD, AND PROGRAM

TECHNICAL FIELD

The present technology relates to an information processing apparatus. In more detail, the present technology relates to an information processing apparatus, a communication system, an information processing method, and a program for causing a computer to execute the method, which exchange information using wireless communication.

BACKGROUND ART

Conventionally, there is a wireless communication technology to exchange information using wireless communication. For example, a standard related to wireless local area network (LAN), namely, the Institute of Electrical and Electronic Engineers (IEEE) 802.11 has been spreading.

In addition, technologies for improving communication efficiency of wireless communication have been proposed. For example, a technology has been proposed in which a plurality of packets is aggregated to be transmitted and a block acknowledgment (ACK) is received as a response thereto (for example, refer to Non-Patent Document 1).

CITATION LIST

Non-Patent Document

Non-Patent Document 1: IEEE 802.11-2012

SUMMARY OF THE INVENTION

Problems to be Solved by the Invention

In the above-described conventional technologies, an information processing apparatus on a transmitting side can judge whether a plurality of packets needs to be retransmitted by aggregating the plurality of packets to transmit and then receiving a Block ACK (BA) as a response thereto.

Here, in the specifications currently employed, a fixed length of 64 bits is used as the size of a BA bitmap. Therefore, for example, in a case where the number of packets that need to be transmitted is larger than the size of the BA bitmap (64 bits), the transmission of a new packet may be blocked. For example, it is not possible to simultaneously transmit packets whose sequence numerals are separated by 64 or more. In addition, for example, the number of packets that can be aggregated may also be restricted. In these cases, the efficiency of wireless communication may decrease. Accordingly, it is important to appropriately set the size of the BA bitmap such that the efficiency of wireless communication is improved.

The present technology has been created in view of such a situation and aims to improve the efficiency of wireless communication.

Solutions to Problems

The present technology has been made to eliminate the above-mentioned disadvantages and a first aspect thereof is an information processing apparatus, an information processing method thereof, and a program for causing a computer to execute the method, including a control unit that controls to determine an information amount to be used for a receipt acknowledgment response to packets to be transmitted on the basis of information relating to the packets. This configuration has effectiveness in that the information amount to be used for the receipt acknowledgment response to the packets to be transmitted is determined on the basis of the information relating to the packets.

In addition, in this first aspect, the information relating to the packets to be transmitted may be designated as the number of the packets to be transmitted or a length from a start sequence numeral to an end sequence numeral among sequence numerals corresponding to the packets to be transmitted. This configuration has effectiveness in that the information amount to be used for the receipt acknowledgment response to the packets to be transmitted is determined on the basis of the number of the packets to be transmitted or the length from the start sequence numeral to the end sequence numeral among the sequence numerals corresponding to the packets to be transmitted.

In addition, in the first aspect, the packets to be transmitted may be designated as packets that have not been successfully transmitted to an appliance as a transmission destination of the packets. This configuration has effectiveness in that packets that have not been successfully transmitted to the appliance as the transmission destination of the packets are designated as the packets to be transmitted.

In addition, in the first aspect, the control unit may control to concatenate packets in agreement with the determined information amount among the packets to be transmitted and transmit the concatenated packets to an appliance as a transmission destination. This configuration has effectiveness in that, among the packets to be transmitted, the packets in agreement with the determined information amount are concatenated and transmitted to the appliance as the transmission destination.

In addition, in the first aspect, the control unit may control to concatenate the packets to be transmitted and transmit the concatenated packets to an appliance as a transmission destination, while determining a size of a bitmap of a Block ACK to be returned to the information processing apparatus by the appliance as the information amount. This configuration has effectiveness in that the packets to be transmitted are concatenated and transmitted to the appliance as the transmission destination and the size of the bitmap of the Block ACK to be returned to the information processing apparatus by this appliance is determined.

In addition, in the first aspect, the control unit may notify an appliance as a transmission destination of the packets of the determined information amount. This configuration has effectiveness in that the determined information amount is notified to the appliance as the transmission destination of the packet.

In addition, in the first aspect, the control unit may include the determined information amount into a predetermined frame to transmit to the appliance. This configuration has effectiveness in that the determined information amount is included into the predetermined frame and transmitted.

In addition, in the first aspect, the control unit may include the determined information amount into one of an ADDBA Request, a data frame, a Block ACK Request, and at least one of a plurality of frames in a concatenated frame in which the plurality of frames are concatenated, to transmit to the appliance. This configuration has effectiveness in that the determined information amount is included into one of the ADDBA Request, the data frame, the Block ACK Request, and at least one of a plurality of frames in a concatenated frame in which the plurality of frames are concatenated, and transmitted to the appliance.

In addition, in the first aspect, in a case where an information amount different from the information amount is notified from the appliance after notifying the information amount, the control unit may newly determine the different information amount as the information amount to be used for the receipt acknowledgment response. This configuration has effectiveness in that, in a case where an information amount different from the information amount is notified from the appliance as the transmission destination after the information amount is notified to the appliance, the different information amount is newly determined as the information amount to be used for the receipt acknowledgment response.

In addition, in the first aspect, the control unit may control to determine the information amount for the packets each time the packets are transmitted to an appliance as a transmission destination and notify the appliance of the determined information amount. This configuration has effectiveness in that, each time the packets are transmitted to the appliance as the transmission destination, the information amount for these packets is determined and the determined information amount is notified to the appliance as the transmission destination.

In addition, in the first aspect, the control unit may determine the information amount to be used when an appliance as a transmission destination of the packets returns the receipt acknowledgment response. This configuration has effectiveness in that the information amount to be used when the appliance as the transmission destination of the packet returns the receipt acknowledgment response is determined.

In addition, in the first aspect, in a case where the receipt acknowledgment response that is compressed is received from the appliance, the control unit may acquire contents of the compressed receipt acknowledgment response that has been received on the basis of the determined information amount. This configuration has effectiveness in that, in a case where the compressed receipt acknowledgment response is received from the appliance as the transmission destination, the contents of this compressed receipt acknowledgment response is acquired on the basis of the determined information amount.

In addition, a second aspect of the present technology is an information processing apparatus, an information processing method thereof, and a program for causing a computer to execute the method, including a control unit that controls to determine an information amount to be used for a receipt acknowledgment response to packets transmitted from an appliance as a transmission source of the packets on the basis of an information amount to be used for the receipt acknowledgment response to the packets notified from the appliance. This configuration has effectiveness in that the information amount to be used for the receipt acknowledgment response for the packets transmitted from the appliance as the transmission source of the packets is determined on the basis of the information amount notified from this appliance.

In addition, in the second aspect, in a case where the information amount notified from the appliance exceeds performance of the information processing apparatus related to wireless communication, the control unit may determine an information amount different from the information amount notified from the appliance within a range of the performance and notify the appliance of the determined information amount. This configuration has effectiveness in that, in a case where the notified information amount exceeds the performance of the information processing apparatus related to wireless communication, an information amount different from the notified information amount is determined within the range of the performance and notified to the appliance.

In addition, a third aspect of the present technology is an information processing apparatus, an information processing method thereof, and a program for causing a computer to execute the method, including a control unit that controls to compress the receipt acknowledgment request to transmit on the basis of an information amount to be used for a receipt acknowledgment response in a case where the receipt acknowledgment response to received packets is to be transmitted. This configuration has effectiveness in that, in a case where the receipt acknowledgment response to the received packets is to be transmitted, the receipt acknowledgment request is compressed and transmitted on the basis of the information amount to be used for the receipt acknowledgment response.

In addition, a fourth aspect of the present technology is a communication system, an information processing method thereof, and a program for causing a computer to execute the method, including: a first information processing apparatus that determines an information amount to be used for a receipt acknowledgment response to packets to be transmitted to a second information processing apparatus on the basis of information relating to the packets and notifies the second information processing apparatus of the determined information amount; and the second information processing apparatus that returns the receipt acknowledgment response to the packets transmitted from the first information processing apparatus to the first information processing apparatus on the basis of the information amount notified from the first information processing apparatus. This configuration has effectiveness in that the first information processing apparatus determines the information amount to be used for the receipt acknowledgment response to the packets to be transmitted to the second information processing apparatus on the basis of the information relating to these packets and notifies the second information processing apparatus of this determined information amount, while the second information processing apparatus returns the receipt acknowledgment response to the packets transmitted from the first information processing apparatus to the first information processing apparatus on the basis of that information amount notified from the first information processing apparatus.

Effects of the Invention

According to the present technology, an excellent effect of improving the efficiency of wireless communication can be exerted. Note that the effects described herein are not necessarily limited and any effects described in the present disclosure may be applied.

BRIEF DESCRIPTION OF DRAWINGS

FIG. 2 is a diagram illustrating comparative examples illustrating exchanges between appliances as the foundation of the present technology.

FIG. 3 is a diagram illustrating an example of a format of a frame exchanged between the information processing apparatuses according to the embodiment of the present technology.

MODE FOR CARRYING OUT THE INVENTION

Modes for carrying out the present technology (hereinafter, referred to as embodiments) will be described below. The description will be given in the following order.

1. Embodiment (an example of determining the size of a Block ACK (BA) bitmap for packets to be transmitted on the basis of information relating to these packets)

2. Application Examples

1. EMBODIMENT

[Configuration Example of Information Processing Apparatus]

Figure 1:
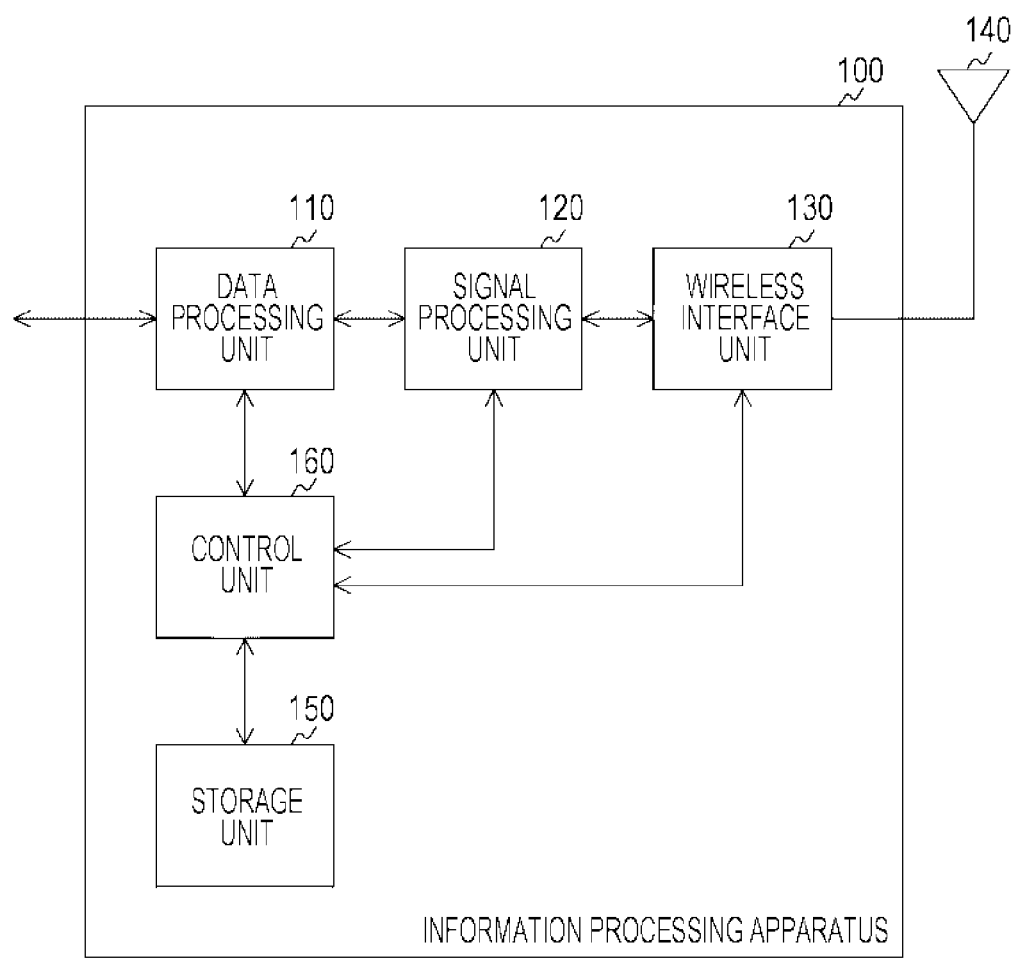
FIG. 1 is a block diagram illustrating a functional configuration example of an information processing apparatus 100 according to an embodiment of the present technology.

FIG. 1 is a block diagram illustrating a functional configuration example of an information processing apparatus 100 according to an embodiment of the present technology.

The information processing apparatus 100 is provided with a data processing unit 110, a signal processing unit 120, a wireless interface unit 130, an antenna 140, a storage unit 150, and a control unit 160.

The data processing unit 110 processes various types of data on the basis of the control of the control unit 160. For example, at the time of data transmission, the data processing unit 110 performs an addition process for a media access control (MAC) header, an error detection code, and the like on data from an upper stage to generate a packet for wireless transmission. Then, the data processing unit 110 supplies this generated packet to the signal processing unit 120.

In addition, for example, at the time of data reception, the data processing unit 110 performs processes such as analysis of a header and detection of a packet error on a bit string received from the signal processing unit 120 and supplies the processed data to the upper stage. Furthermore, for example, the data processing unit 110 notifies the control unit 160 of an analysis result of the header, a detection result of the packet error, and the like.

The signal processing unit 120 performs various types of signal processes on the basis of the control of the control unit 160. For example, at the time of data transmission, the signal processing unit 120 encodes input data from the data processing unit 110 on the basis of coding and a modulation scheme set by the control unit 160 and adds a preamble and a physical (PHY) header thereto. Then, the signal processing unit 120 supplies a transmission symbol stream produced by the above signal process to the wireless interface unit 130.

In addition, for example, at the time of data reception, the signal processing unit 120 detects the preamble and the PHY header of a received symbol stream received from the wireless interface unit 130 and then performs a decoding process thereon to supply to the data processing unit 110. Furthermore, for example, the signal processing unit 120 notifies the control unit 160 of a detection result of the PHY header, and the like.

The wireless interface unit 130 is an interface for connecting to another information processing apparatus and transmitting and receiving various types of information using wireless communication on the basis of the control of the control unit 160. For example, at the time of data transmission, the wireless interface unit 130 converts an input from the signal processing unit 120 into an analog signal and carries out amplification, filtering, and up-conversion to a predetermined frequency thereon to send to the antenna 140.

In addition, for example, at the time of data reception, the wireless interface unit 130 performs a process opposite to that at the time of data transmission on an input from the antenna 140 and supplies a processing result thereof to the signal processing unit 120.

The storage unit 150 has a role as a work area for data processes by the control unit 160 and a function as a storage medium holding various types of data. For example, a storage medium such as a nonvolatile memory, a magnetic disk, an optical disc, or a magneto optical (MO) disk can be used as the storage unit 150. Note that, for example, an electrically erasable programmable read-only memory (EEPROM) or an erasable programmable ROM (EPROM) can be used as the nonvolatile memory. In addition, for example, a hard disk or a disc-shaped magnetic substance disk can be used as the magnetic disk. In addition, for example, a compact disc (CD), a digital versatile disc recordable (DVD-R), a Blu-Ray disc (BD (registered trademark)) can be used as the optical disc.

The control unit 160 controls a reception action and a transmission action of each of the data processing unit 110, the signal processing unit 120, and the wireless interface unit 130. For example, the control unit 160 transfers information between respective units, sets communication parameters, and schedules packets for the data processing unit 110.

For example, the control unit 160 controls to concatenate packets to be transmitted and transmit the concatenated packets to an appliance as a transmission destination. In this case, the control unit 160 controls to determine an information amount (for example, the size of a Block ACK (BA) bitmap) to be used for a receipt acknowledgment response (for example, a block acknowledgment (ACK)) to those packets to be transmitted on the basis of information relating to these packets. Here, the information relating to these packets to be transmitted is, for example, the number of the packets to be transmitted or a length from a start sequence numeral to an end sequence numeral among sequence numerals corresponding to the packets to be transmitted.

COMPARATIVE EXAMPLE

Information exchange using the Institute of Electrical and Electronic Engineers (IEEE) 802.11 will be described here. In order to improve the communication efficiency, IEEE 802.11 uses a technology in which a plurality of packets are aggregated to be transmitted and a Block ACK is received as a response thereto. In addition, in the specifications currently employed, a fixed length of 64 bits is used as the size of the BA bitmap. Accordingly, FIG. 2 illustrates comparative examples (comparative examples to the embodiment of the present technology) in a case where communication is performed using such a Block ACK.

FIG. 2 is a diagram illustrating the comparative examples illustrating exchanges between appliances as the foundation of the present technology. In FIG. 2, the exchange of information between an access point (AP) and a station (STA) is illustrated as an example.

In a of FIG. 2, a comparative example in the case of using an Immediate Block ACK is illustrated. In a of FIG. 2, an example of a case where the AP transmits packets with Sequence Numbers=1 to 64 to the STA and a part thereof (Sequence Numbers=1 to 5) results in packets to be retransmitted is illustrated. That is, in a of FIG. 2, the AP transmits packets with Sequence Numbers=1 to 64 waiting for transmission (21) to the STA (11). Then, the STA transmits a Block ACK for those packets to the AP (12). In this case, it is assumed that the STA has failed to receive a part of the packets (Sequence Numbers=1 to 5).

Here, the AP has packets with Sequence Numbers=65 to 128 waiting for transmission (22). However, the AP cannot transmit the packets with the Sequence Numbers=65 to 128 waiting for transmission (22) to the STA until the transmission of the packets to be retransmitted (Sequence Numbers=1 to 5) is successful.

Accordingly, the AP transmits the packets to be retransmitted (Sequence Numbers=1 to 5) to the STA (13). Then, the STA transmits the Block ACK for those packets to the AP (14). In this case, it is assumed that the reception of these retransmitted packets (Sequence Numbers=1 to 5) has failed.

Therefore, the AP transmits again the packets to be retransmitted (Sequence Numbers=1 to 5) to the STA (15). Then, the STA transmits the Block ACK for those packets to the AP (16). In this case, it is assumed that the reception of these retransmitted packets (Sequence Numbers=1 to 5) is successful.

In this manner, in a case where the reception of the packets (Sequence Numbers=1 to 64) is successful, the STA transmits the Block ACK to that effect to the AP (16). Therefore, the AP can transmit the packets with the Sequence Numbers=65 to 128 waiting for transmission (22) to the STA (17). In addition, the STA transmits the Block ACK for those packets to the AP (18).

In b of FIG. 2, a comparative example in the case of using a Delayed Block ACK is illustrated. In b of FIG. 2, an example of a case where the AP transmits packets with Sequence Numbers=1 to 64 to the STA and a part thereof (Sequence Numbers=1 to 5) results in packets to be retransmitted is illustrated. That is, in b of FIG. 2, the AP transmits packets with Sequence Numbers=1 to 64 waiting for transmission (41) to the STA (31). The AP also transmits a block acknowledgment request (BAR) for those packets to the STA (32). Then, the STA transmits the Block ACK for those packets to the AP (33). In this case, it is assumed that the STA has failed to receive a part of the packets (Sequence Numbers=1 to 5).

Here, the AP has packets with Sequence Numbers=65 to 128 waiting for transmission (42). However, the AP cannot transmit the packets with the Sequence Numbers=65 to 128 waiting for transmission (42) to the STA until the transmission of the packets to be retransmitted (Sequence Numbers=1 to 5) is successful.

Accordingly, the AP transmits the packets to be retransmitted (Sequence Numbers=1 to 5) to the STA (34). The AP also transmits the BAR for those packets to the STA (35). Then, the STA transmits the Block ACK for those packets to the AP (36). In this case, it is assumed that the reception of these retransmitted packets (Sequence Numbers=1 to 5) has failed.

Therefore, the AP transmits again the packets to be retransmitted (Sequence Numbers=1 to 5) to the STA (37). The AP also transmits the BAR for those packets to the STA (38). Then, the STA transmits the Block ACK for those packets to the AP (39). In this case, it is assumed that the reception of these retransmitted packets (Sequence Numbers=1 to 5) is successful.

In this manner, in a case where the reception of the packets (Sequence Numbers=1 to 64) is successful, the STA transmits the Block ACK to that effect to the AP (39). Therefore, the AP can transmit the packets with the Sequence Numbers=65 to 128 waiting for transmission (42) to the STA (40).

In this manner, since the size of the BA bitmap is 64, an apparatus on a transmitting side (AP) cannot transmit a new frame in some cases until these packets are deemed as successful transmissions. That is, in a case where packets that need to be transmitted are larger than the size of the BA bitmap, the transmission of a new frame may be blocked. In addition, since the size of the BA bitmap is 64, an apparatus on the transmitting side (AP) cannot simultaneously transmit packets whose Sequence Numbers are separated by 64 or more. Furthermore, the number of frames that can be aggregated may also be restricted.

Accordingly, the embodiment of the present technology will indicate an example in which the size of the BA bitmap is appropriately set such that the efficiency of wireless communication is improved. That is, the embodiment of the present technology will indicate an example for providing a protocol function for appropriately determining the size of the BA bitmap.

[Example of Frame Format]

FIG. 3 is a diagram illustrating an example of a format of a frame exchanged between the information processing apparatuses according to the embodiment of the present technology.

A frame illustrated in a of FIG. 3 is made up of a PHY header 201, a MAC header 202, a DATA 203, and a cyclic redundancy check (CRC) 204.

As illustrated in b of FIG. 3, a Starting Sequence Number 205 and a Bitmap Size 206 are saved In the DATA 203.

The Starting Sequence Number 205 means a start sequence numeral among sequence numerals corresponding to packets to be transmitted.

The Bitmap Size 206 means an information amount (for example, the size of the BA bitmap) to be used for a receipt acknowledgment response (for example, BA) to packets to be transmitted.

For example, it is possible to exchange the frame illustrated in a of FIG. 3 at a timing when some information is exchanged between the information processing apparatus on a transmitting side and the information processing apparatus on a receiving side. For example, in a case where Capability is exchanged in Handshake, the frame illustrated in a of FIG. 3 can be exchanged. In this manner, the Starting Sequence Number 205 and the Bitmap Size 206 can be notified to another appliance by exchanging the frame illustrated in a of FIG. 3.

Figure 5:
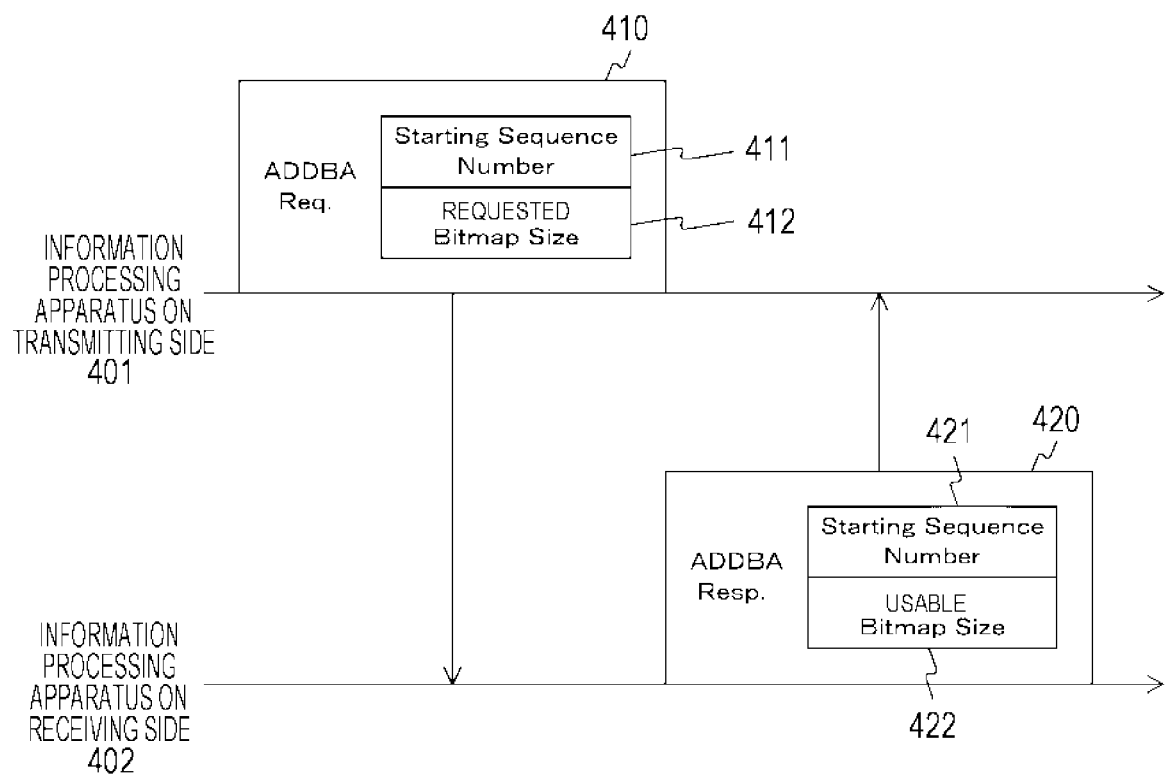
FIG. 5 is a diagram illustrating an example of a case of determining a size of a BA bitmap using an ADDBA Request and an ADDBA Response exchanged between the information processing apparatuses according to the embodiment of the present technology.
Figure 9:
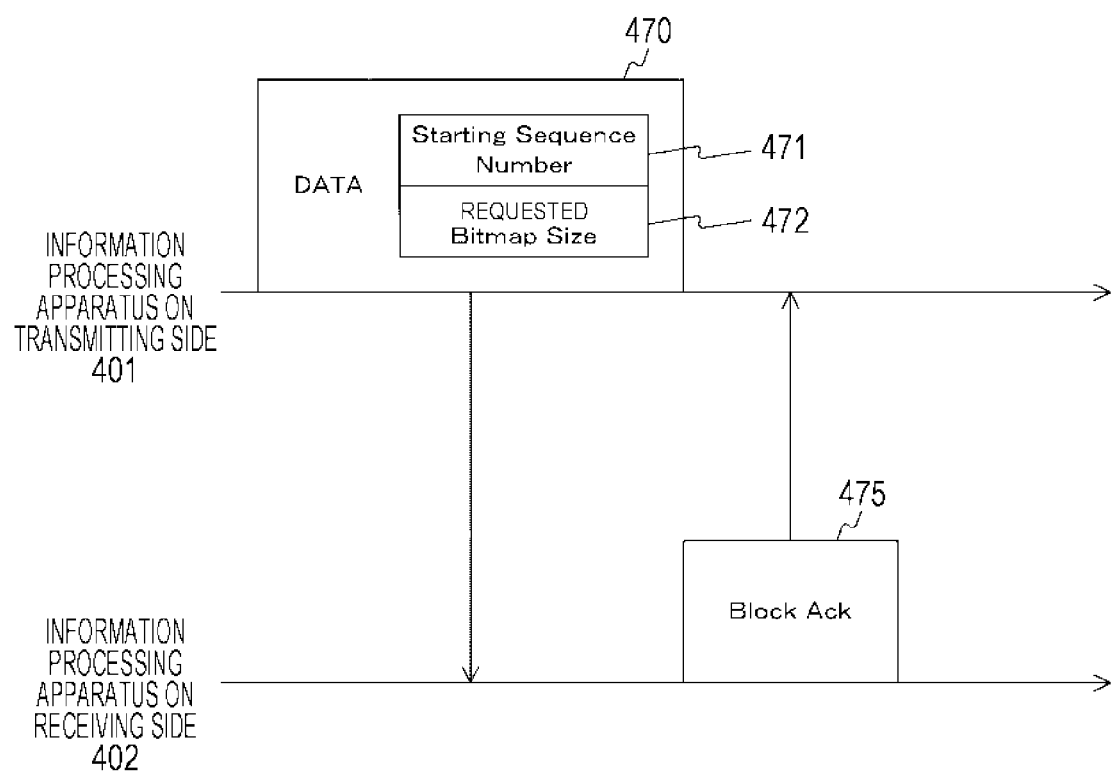
FIG. 9 is a diagram illustrating an example of a case of determining the size of the BA bitmap using a data frame exchanged between the information processing apparatuses according to the embodiment of the present technology.
Figure 10:
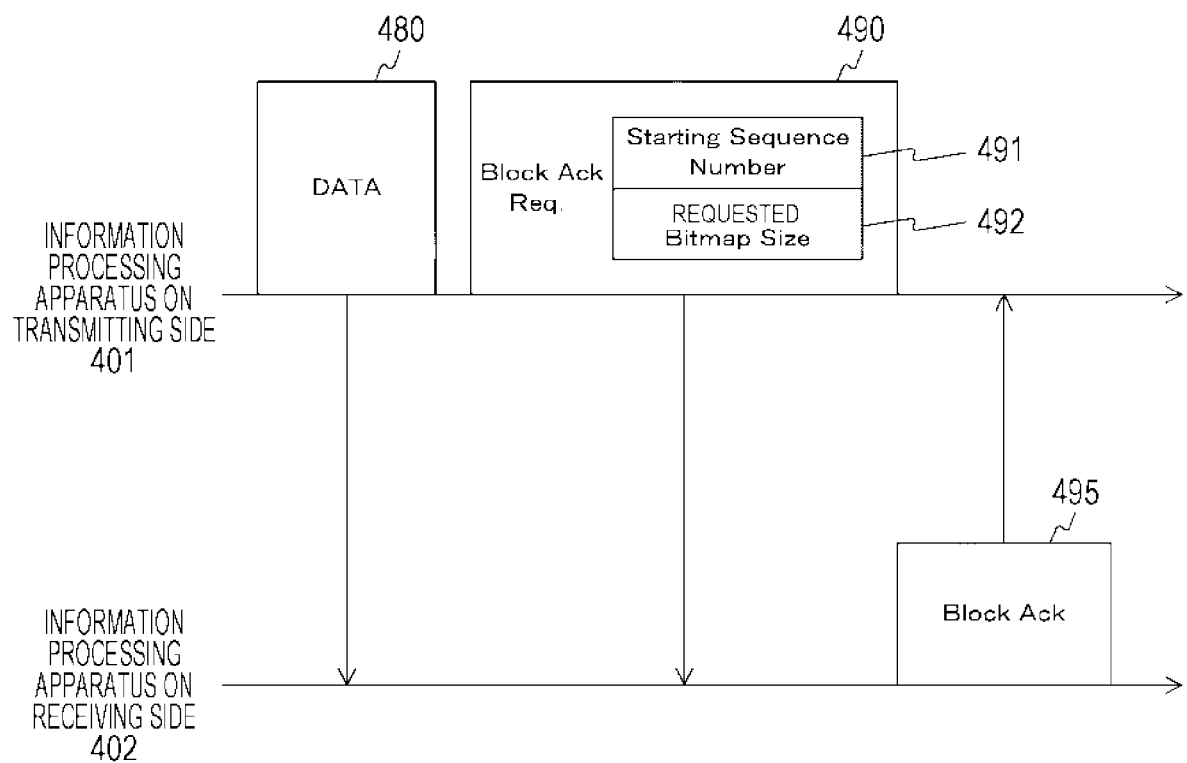
FIG. 10 is a diagram illustrating an example of a case of determining the size of the BA bitmap using a data frame exchanged between the information processing apparatuses according to the embodiment of the present technology.

For example, the frame illustrated in a of FIG. 3 can be exchanged as an ADDBA Request 410 and an ADDBA Response 420 illustrated in FIG. 5, a data frame 470 illustrated in FIG. 9, and a BAR 490 illustrated in FIG. 10.

Here, according to the current IEEE 802.11 specifications, the maximum number of packets that can be represented by the BA bitmap is 64 as described earlier. Therefore, in order to represent the number of packets equal to or greater than 64, it is necessary to newly define another frame. Accordingly, FIG. 4 illustrates an example of representing 64 or more packets using a plurality of existing Block ACK frames.

[Example of Format of Block ACK Frame]

Figure 4:
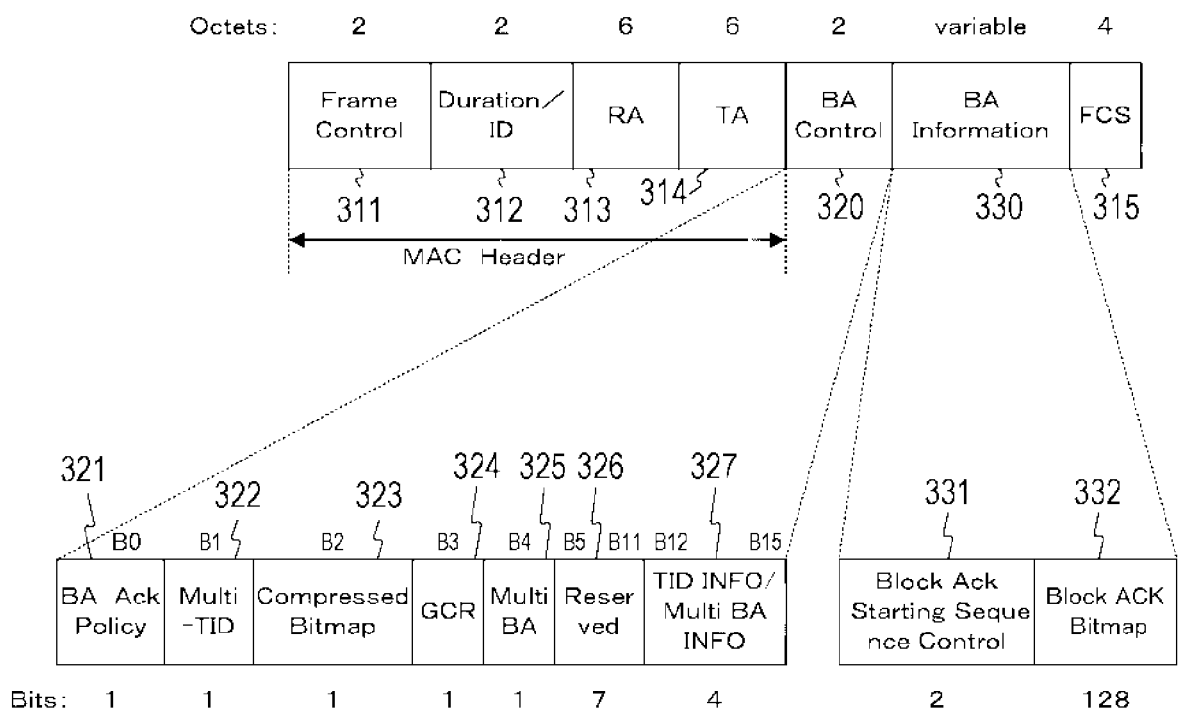
FIG. 4 is a diagram illustrating an example of a format of a Block ACK frame exchanged between the information processing apparatuses according to the embodiment of the present technology.

FIG. 4 is a diagram illustrating an example of a format of the Block ACK frame exchanged between the information processing apparatuses according to the embodiment of the present technology.

A bit of a Multi BA 325 is newly arranged in a Reserved area of a block acknowledgment (BA) control 320 (fields 321 to 327) in the Block ACK frame (fields 311 to 315, 320, 330) illustrated in FIG. 4. With this configuration, the existing Block ACK frame can be extended to represent the bitmap of 64 or more packets.

The maximum value of the bitmap that can be saved in one Block ACK frame is 128 octets. Therefore, in a case where the information processing apparatus on the transmitting side requests a size of 128 octets or more, the information processing apparatus on the receiving side transmits a plurality of Block ACK frames. In this case, the information processing apparatus on the receiving side may concatenate (aggregate) the plurality of Block ACKs to transmit.

Here, in a case where the information processing apparatus on the receiving side transmits a plurality of Block ACK frames, it is necessary to enable the information processing apparatus on the transmitting side to distinguish which packet to which packet constitute a bitmap corresponding to each frame.

Accordingly, FIG. 4 illustrates an example of utilizing a field used as TID_INFO in a BA Control (corresponding to the BA Control 320) in the existing Block ACK frame. For example, in a case where the bit of the BA Control 320 is settled, the TID_INFO is read as an identifier called Multi-BA_INFO such that each Block ACK frame can be identified.

Meanwhile, a Block ACK Starting Sequence Control 331 and a Block ACK Bitmap 332 are saved in a BA Information 330 of the Block ACK frame (fields 311 to 315, 320, 330) illustrated in FIG. 4. The Block ACK Starting Sequence Control 331 and the Block ACK Bitmap 332 will be described in detail with reference to FIG. 6 and other drawings.

[Example of Determining Size of BA Bitmap in ADDBA Sequence]

FIG. 5 is a diagram illustrating an example of a case of determining the size of the BA bitmap using an ADDBA Request and an ADDBA Response exchanged between the information processing apparatuses according to the embodiment of the present technology. That is, FIG. 5 illustrates an example of a case of determining the size of the BA bitmap in an ADDBA sequence.

In FIG. 5, an appliance on a traffic (data) transmitting side is illustrated as an information processing apparatus 401 on the transmitting side and an appliance on a traffic receiving side is illustrated as an information processing apparatus 402 on the receiving side. The information processing apparatus 401 on the transmitting side and the information processing apparatus 402 on the receiving side correspond to the information processing apparatus 100 illustrated in FIG. 1. Note that the information processing apparatus 401 on the transmitting side is an example of a first information processing apparatus described in the claims. Meanwhile, the information processing apparatus 402 on the receiving side is an example of a second information processing apparatus described in the claims.

The information processing apparatus 401 on the transmitting side can be designated as, for example, an access point (AP) that provides a wireless communication service to one or a plurality of appliances connected to the own apparatus (including the information processing apparatus 402 on the receiving side). In addition, the information processing apparatus 402 on the receiving side can be designated as, for example, a station (STA) that is connected to the information processing apparatus 401 on the transmitting side to perform wireless communication.

For example, the information processing apparatus 401 on the transmitting side and the information processing apparatus 402 on the receiving side are connected to each other via wireless communication so as to be able to directly transmit and receive frames. In addition, for example, by transmitting and receiving the ADDBA Request and the ADDBA Response between the information processing apparatus 401 on the transmitting side and the information processing apparatus 402 on the receiving side, preparations for transmitting and receiving the BAR and the BA can be completed. Upon completion of such preparations, the information processing apparatus 402 on the receiving side is put into a state capable of receiving the BAR and returning the BA.

First, the information processing apparatus 401 on the transmitting side determines the size of the BA bitmap to be requested to the information processing apparatus 402 on the receiving side. A method for determining the size of the BA bitmap mentioned above will be described in detail with reference to FIG. 11.

Subsequently, the information processing apparatus 401 on the transmitting side requests the information processing apparatus 402 on the receiving side of a Starting Sequence Number 411 and that determined size of the BA bitmap (requested Bitmap Size 412). In this case, for example, the information processing apparatus 401 on the transmitting side can include the Starting Sequence Number 411 and the requested Bitmap Size 412 into the ADDBA Request 410 to transmit to the information processing apparatus 402 on the receiving side. Here, the Starting Sequence Number 411 and the requested Bitmap Size 412 correspond to the Starting Sequence Number 205 and the Bitmap Size 206 illustrated in b of FIG. 3.

In addition, the information processing apparatus 402 on the receiving side can acquire the start sequence numeral of the packets to be transmitted from the information processing apparatus 402 on the receiving side on the basis of the Starting Sequence Number 411 included in the ADDBA Request 410. Then, the information processing apparatus 402 on the receiving side includes the acquired start sequence numeral into a Starting Sequence Number 421.

Furthermore, the information processing apparatus 402 on the receiving side can grasp the size of the BA bitmap requested from the information processing apparatus 401 on the transmitting side on the basis of the requested Bitmap Size 412 included in the ADDBA Request 410. Then, the information processing apparatus 402 on the receiving side judges whether transmission (transmission from the own apparatus) with the size of the BA bitmap requested from the information processing apparatus 401 on the transmitting side is feasible.

In a case where transmission with that requested size of the BA bitmap is feasible, the information processing apparatus 402 on the receiving side includes the same value as this requested size of the BA bitmap into a usable Bitmap Size 422. On the other hand, in a case where transmission with that requested size of the BA bitmap is not feasible, the information processing apparatus 402 on the receiving side includes a value of the maximum size of the bitmap that can be secured by the own apparatus into the usable Bitmap Size 422. Here, the value of the maximum size of the bitmap that can be secured by the own apparatus falls within the range of the size of the BA bitmap requested from the information processing apparatus 401 on the transmitting side.

In this manner, the information processing apparatus 402 on the receiving side returns the ADDBA Response 420 in which the respective values are saved in the Starting Sequence Number 411 and the usable Bitmap Size 422 to the information processing apparatus 401 on the transmitting side.

For example, a case where the information processing apparatus 402 on the receiving side can secure only a size smaller than the size of the BA bitmap requested from the information processing apparatus 401 on the transmitting side due to the physical constraints of the own apparatus is also supposed. Accordingly, as illustrated in FIG. 5, the ADDBA Request 410 and the ADDBA Response 420 are exchanged between the information processing apparatus 401 on the transmitting side and the information processing apparatus 402 on the receiving side. With this configuration, the information processing apparatus 402 on the receiving side can notify the information processing apparatus 401 on the transmitting side that the information processing apparatus 402 on the receiving side can secure only a size smaller than the size of the BA bitmap requested from the information processing apparatus 401 on the transmitting side.

Here, it is also supposed that the information processing apparatus on the receiving side is not provided with a specific function (a function of setting the size of the BA bitmap requested from the information processing apparatus on the transmitting side). In this case, the usable Bitmap Size 422 is not included in the ADDBA Response 420 received by the information processing apparatus 401 on the transmitting side. Accordingly, in a case where the ADDBA Response 420 not including the usable Bitmap Size 422 is received, the information processing apparatus 401 on the transmitting side can judge that the information processing apparatus on the receiving side is not compatible with the specific function. Then, in a case where it is judged that the information processing apparatus on the receiving side is not compatible with the specific function, the information processing apparatus 401 on the transmitting side can judge that a size of 64 bits is to be used for the BA bitmap.

In this manner, the ADDBA Request 410 and the ADDBA Response 420 are exchanged between the information processing apparatus 401 on the transmitting side and the information processing apparatus 402 on the receiving side. In addition, each piece of information exchanged in this manner is held in a storage unit (equivalent to the storage unit 150 illustrated in FIG. 1) of each appliance to be used. With this configuration, it is possible to appropriately set the size of the BA bitmap that can be exchanged between the information processing apparatus 401 on the transmitting side and the information processing apparatus 402 on the receiving side.

In addition, on the basis of the size of the BA bitmap thus set, the information processing apparatus 402 on the receiving side can transmit the BA for the packets transmitted from the information processing apparatus 401 on the transmitting side to the information processing apparatus 401 on the transmitting side.

Figure 8:
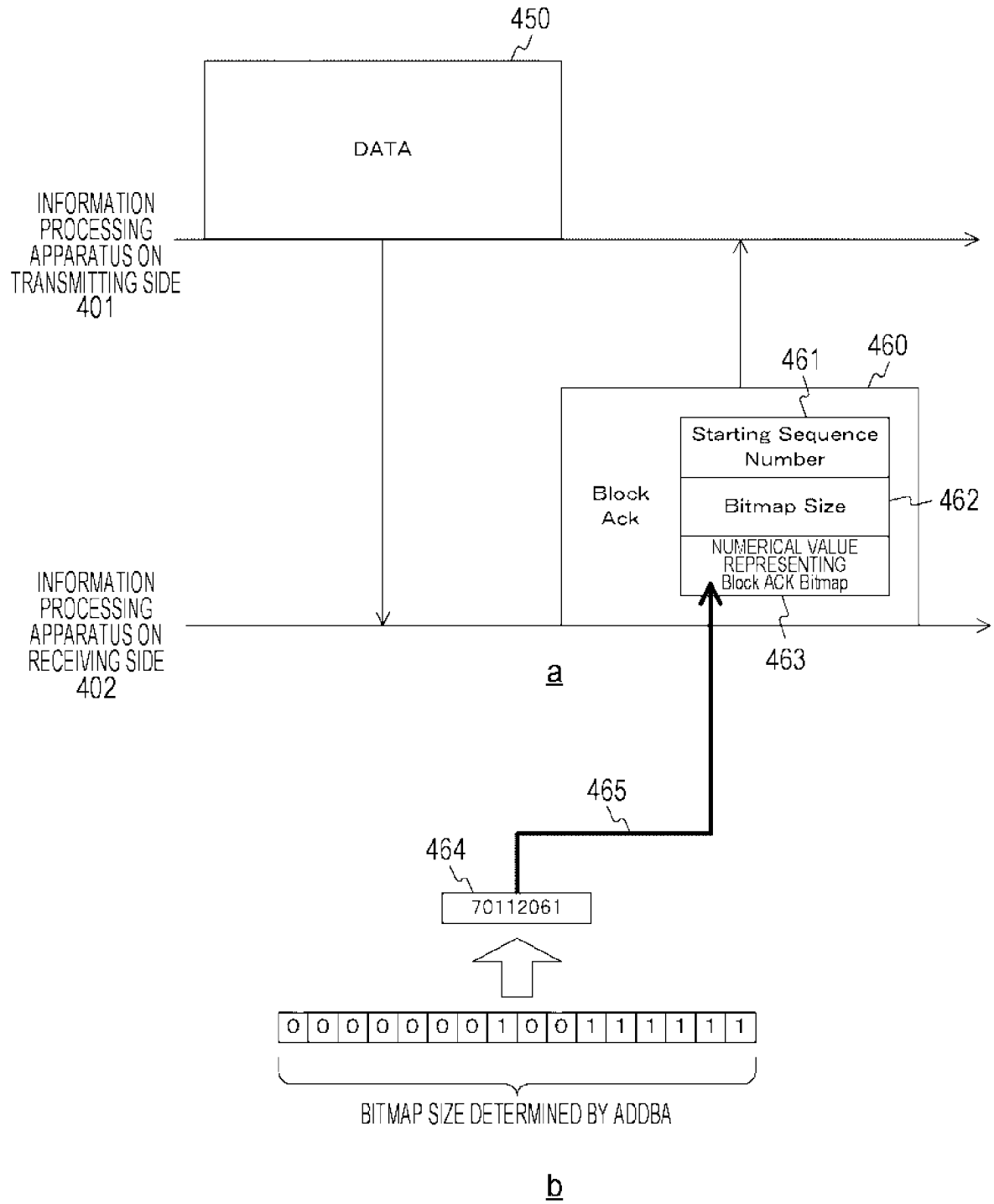
FIG. 8 is a diagram illustrating an example of compression in a case where the information processing apparatus on the receiving side according to the embodiment of the present technology compresses the BA bitmap to transmit.

Here, the BA only needs to be capable of conveying information relating to an acknowledged packet. For example, in a case where portions that are not acknowledged are consecutive, the information amount can be decreased by compressing those portions. For example, the BA bitmap can be compressed to be transmitted. An example of this case is illustrated in FIGS. 6 and 8.

Here, in a case where the BA bitmap is compressed to be transmitted, it is necessary to make an exchange beforehand between the information processing apparatus on the transmitting side and the information processing apparatus on the receiving side. For example, the information processing apparatus on the receiving side can save, in the DATA 203 illustrated in a of FIG. 3, the fact that the own apparatus is provided with a compression function and has a possibility of compressing the BA bitmap to transmit and can notify the information processing apparatus on the transmitting side of this fact. Alternatively, this fact may be notified through an exchange made at another timing between the information processing apparatus on the transmitting side and the information processing apparatus on the receiving side.

[Example of Compressing BA Bitmap to Transmit]

Figure 6:
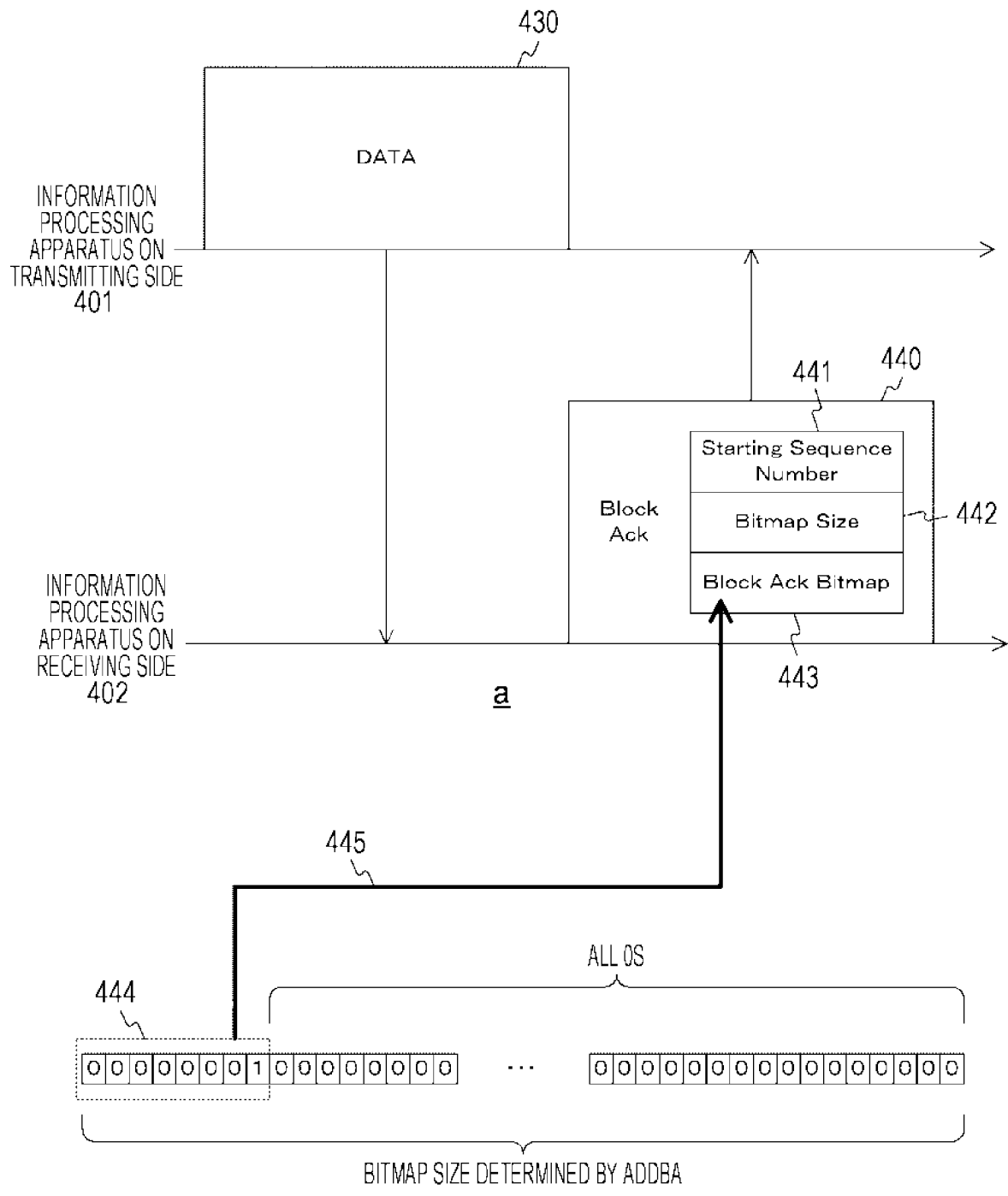
FIG. 6 is a diagram illustrating an example of compression in a case where the information processing apparatus on a receiving side according to the embodiment of the present technology compresses the BA bitmap to transmit.

FIG. 6 is a diagram illustrating an example of compression in a case where the information processing apparatus on the receiving side according to the embodiment of the present technology compresses the BA bitmap to transmit.

In a of FIG. 6, an example in which the information processing apparatus 401 on the transmitting side transmits a data frame 430 to the information processing apparatus 402 on the receiving side and the information processing apparatus 402 on the receiving side transmits a Block ACK 440 for the data frame 430 to the information processing apparatus 401 on the transmitting side is illustrated.

As illustrated in a of FIG. 6, a Starting Sequence Number 441, a Bitmap Size 442, and a Bitmap 443 are saved in the Block ACK 440. These pieces of information correspond to the respective pieces of information in the BA Information 330 illustrated in FIG. 4.

The Starting Sequence Number 441 means a start sequence numeral among sequence numerals corresponding to packets constituting the data frame 430.

The Bitmap Size 442 refers to the size of the BA bitmap included in the Block ACK 440 for the data frame 430. This size is set by the exchange illustrated in FIG. 5.

The Bitmap 443 refers to bitmap information indicating the ACK for the data frame 430. For example, information on the size of the BA bitmap set by the exchange illustrated in FIG. 5 (for example, respective pieces of the information (0 and 1) illustrated in b of FIG. 6) is saved as the Bitmap 443.

In b of FIG. 6, an example of the bitmap 443 saved in the Block ACK 440 is illustrated. In the example illustrated in b of FIG. 6, "1" is saved in the area of a sequence numeral corresponding to a packet which has been successfully received among the packets constituting the data frame 430. Meanwhile, "0" is saved in the area of a sequence numeral corresponding to a packet which has failed to be received among the packets constituting the data frame 430.

In b of FIG. 6, an example of a case where only the eighth packet from the left is acknowledged (that is, "1" is saved in the eighth area from the left) is illustrated.

As described earlier, the BA only needs to be capable of convey information relating to the acknowledged packet. For example, in a case where portions that are not acknowledged are consecutive, the information amount can be decreased by compressing those portions. For example, in the example illustrated in b of FIG. 6, only the eighth packet from the left is acknowledged and, thereafter, portions which are not acknowledged are consecutive. Therefore, the transmission of the bits of the ninth and the following packets from the left can be omitted.

Accordingly, as indicated by an arrow 445, only respective pieces of information illustrated within a dotted rectangle 444 can be saved in the Block ACK 440 as the Bitmap 443 to be transmitted. In this case, the information processing apparatus 401 on the transmitting side can grasp the size of the bitmap included in the Block ACK 440 on the basis of the Bitmap Size 442 included in the received Block ACK 440. Therefore, the information processing apparatus 401 on the transmitting side can grasp that the transmission of the bits of the ninth and the following packets from the left is omitted.

In this manner, in a case where portions that are not acknowledged are consecutive, the size of the BA can be made smaller by compressing the bitmap of those portions to transmit. With this configuration, the transmission time can be shortened and the consumed power can be reduced. The occupation ratio of the band also can be reduced.

Here, FIG. 6 illustrates an example in which the information processing apparatus on the receiving side notifies the information processing apparatus on the transmitting side of the size of the BA bitmap as the Bitmap Size 442. That is, in FIG. 6, an example of notifying the size itself of the BA bitmap is illustrated. However, instead of the size itself of the BA bitmap, a notification may be made on which of representative sizes of the BA bitmap is used, using information specified by a known rule (for example, information that accompanies). An example of this case is illustrated in FIG. 7.

[Example of Notifying Size of Bitmap Using Accompanying Information]

Figure 7:
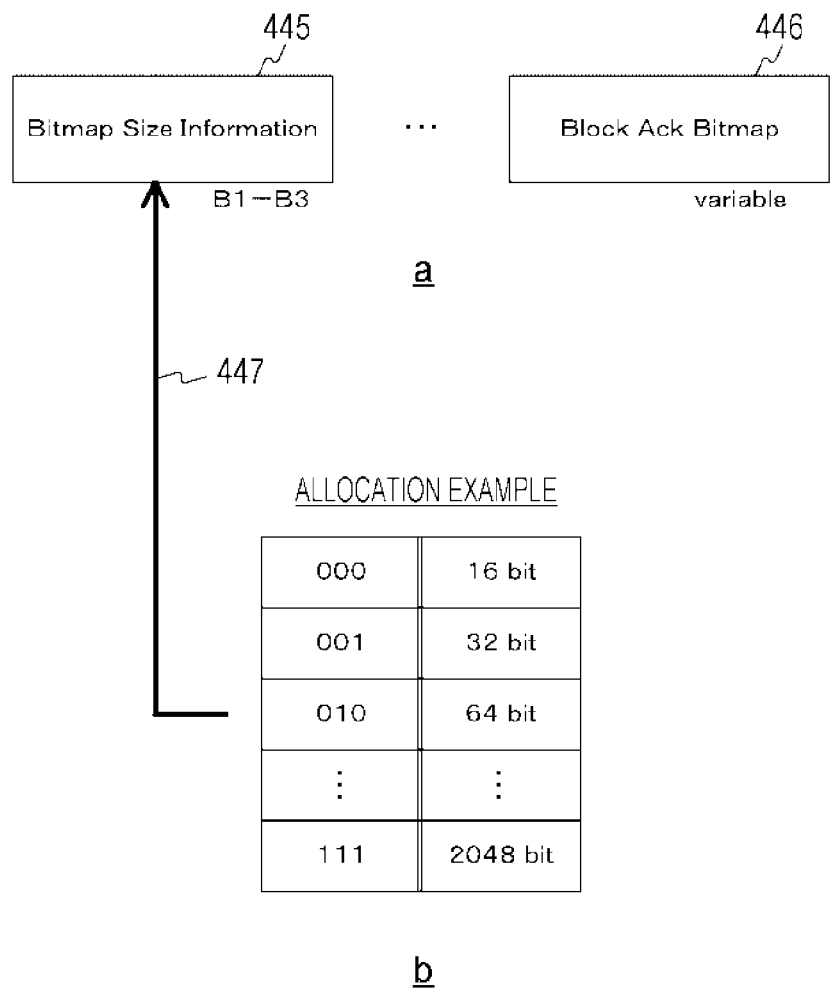
FIG. 7 is a diagram illustrating an example of notification in a case where the information processing apparatus on the receiving side according to the embodiment of the present technology notifies the size of the BA bitmap.

FIG. 7 is a diagram illustrating an example of notification in a case where the information processing apparatus on the receiving side according to the embodiment of the present technology notifies the size of the BA bitmap.

In a of FIG. 7, a part of a frame transmitted from the information processing apparatus on the transmitting side to the information processing apparatus on the receiving side is illustrated in a simplified manner. This frame includes Bitmap Size Information 445 and a Block ACK Bitmap 446.

In b of FIG. 7, an example of relationships between the sizes of the BA bitmap (for example, 16 bits, 32 bits, 64 bits, . . . , and 2048 bits) and the information specified by a known rule (for example, 000, 001, 010, . . . , and 111) is illustrated.

For example, the information processing apparatus on the receiving side saves the information specified by the known rule illustrated in b of FIG. 7 in the Bitmap Size Information 445, thereby being able to notify the information processing apparatus on the transmitting side of the size of the BA bitmap. For example, the information processing apparatus on the receiving side saves "001" in the Bitmap Size Information 445 as the size of the BA bitmap, thereby being able to notify the information processing apparatus on the transmitting side of the size "32 bits" of the BA bitmap.

In this manner, the size of the BA bitmap (for example, 16 bits, 32 bits, 64 bits, . . . , and 2048 bits) can be notified to the information processing apparatus on the transmitting side using information specified by a known rule (for example, 000, 001, 010, . . . , and 111).

In addition, although FIG. 6 illustrates an example of compressing the BA bitmap by not transmitting unnecessary bits, the BA bitmap may be compressed by another compression method. For example, it is conceivable to digitize consecutive same bits to compress. An example of this case is illustrated in FIG. 8.

[Example of Compressing BA Bitmap to Transmit]

FIG. 8 is a diagram illustrating an example of compression in a case where the information processing apparatus on the receiving side according to the embodiment of the present technology compresses the BA bitmap to transmit. Specifically, an example of digitizing the BA bitmap to compress is illustrated.

In a of FIG. 8, an example in which the information processing apparatus 401 on the transmitting side transmits a data frame 450 to the information processing apparatus 402 on the receiving side and the information processing apparatus 402 on the receiving side transmits a Block ACK 460 for the data frame 450 to the information processing apparatus 401 on the transmitting side is illustrated.

As illustrated in a of FIG. 8, a Starting Sequence Number 461, a Bitmap Size 462, and a numerical value 463 representing a Block ACK Bitmap are saved in the Block ACK 460. Note that the Starting Sequence Number 461 and the Bitmap Size 462 correspond to the Starting Sequence Number 441 and the Bitmap Size 442 illustrated in a of FIG. 6.

The numerical value 463 representing the Block ACK Bitmap refers to information indicating the Block ACK for the data frame 430. For example, information on the size set by the exchange illustrated in FIG. 5 (for example, a numerical value illustrated in b of FIG. 8 (70112061 (illustrated within a rectangle 464))) is saved as the numerical value 463 representing the Block ACK Bitmap.

In b of FIG. 8, an example of the numerical value 463 representing the Block ACK Bitmap saved in the Block ACK 460 is illustrated. In the example illustrated in b of FIG. 8, "1" is saved in the area of a sequence numeral corresponding to a packet which has been successfully received among packets constituting the data frame 450.

Meanwhile, "0" is saved in the area of a sequence numeral corresponding to a packet which has failed to be received among the packets constituting the data frame 450.

In b of FIG. 8, an example of the bitmap in which seven "0s" are put one after another from the left, followed by one "1", followed by two "0s", and followed by six "1s" in order is illustrated. Accordingly, 0, 1, and the numbers of these consecutive figures can be saved as a numerical value representing the bitmap instead of the bitmap.

For example, in b of FIG. 8, since seven "0s" are put one after another from the left in order, "70" is placed first. In addition, since one "1" follows the preceding figures, "11" is placed next to "70". Likewise, since two "0s" follow the preceding figures, "20" is placed next to "7011". Likewise, since six "1s" follow the preceding figures, "61" is placed next to "701120". In this manner, in the example illustrated in b of FIG. 8, the numerical value representing the bitmap can be expressed as "70112061 (illustrated within the rectangle 464)". Then, as indicated by an arrow 465, the numerical value representing the bitmap "70112061" is saved in the numerical value 463 representing the Block ACK Bitmap.

Here, for example, in a case where ten or more 0s or 1s are put one after another, it is also supposed that 0 and 1 cannot be distinguished from the numbers of these consecutive figures. For example, if eleven "0s" are put one after another, these figures are expressed as 110 and thus the above-described rule cannot be applied. Accordingly, calculations of possible patterns may be sequentially performed until divisions in which the size of the BA bitmap becomes the determined value are found.

For example, each pattern of a case where the number of consecutive 0s and 1s is less than ten, a case where the number of consecutive 0s is ten or more, and a case where the number of consecutive 1s is ten or more is sequentially calculated. In a case where it is also supposed that one hundred or more 0s and 1s are put one after another, the calculation for this case is performed. Then, it is possible to find divisions corresponding to a calculation result in which the size of the BA bitmap matches the determined value.

Note that, "07110216" in which 0 and 1, and the numbers of these consecutive figures are reversed may be designated as a numerical value representing the bitmap.

In addition, utilizing the fact that the BA bitmap consists of only "0" and "1", only the first bit may be notified such that bit type information is removed after that and only the number of consecutive figures is notified. For example, 0000000100111111 can be digitized and compressed as "0+7126" or "70126".

In this manner, the size of the BA can be made smaller by digitizing and compressing the bitmap. With this configuration, the transmission time can be shortened and the consumed power can be reduced. The occupation ratio of the band also can be reduced.

Note that, a compression method other than the respective compression methods described above can be used as a compression technique. For example, other lossless compression techniques may be used for the bitmap compression technique. Among lossless compression techniques, for example, one using Shannon code or Huffman code as an entropy code or one using Defrate or Lempel-Ziv as a lexicographic compression technique also may be adopted.

The above example indicates a case of setting the size of the BA bitmap using the ADDBA Request and the ADDBA Response exchanged between the information processing apparatus on the transmitting side and the information processing apparatus on the receiving side. An example of dynamically setting the size of the BA bitmap using the data frame will be indicated below.

[Example of Dynamically Determining Size of BA Bitmap]

FIG. 9 is a diagram illustrating an example of a case of determining the size of the BA bitmap using the data frame exchanged between the information processing apparatuses according to the embodiment of the present technology. That is, FIG. 9 illustrates an example of transmitting information for determining the size of the BA bitmap as additional information on the data frame such that the size of the BA bitmap is exchanged dynamically during data communication.

For example, the information processing apparatus 401 on the transmitting side includes a Starting Sequence Number 471 and a requested Bitmap Size 472 into a data frame 470 to transmit to the information processing apparatus 402 on the receiving side.

Here, for example, it is also supposed that the information processing apparatus 401 on the transmitting side grasps the size of the BA bitmap usable by the information processing apparatus 402 on the receiving side through the exchange of information made between the information processing apparatus 401 on the transmitting side and the information processing apparatus 402 on the receiving side. For example, by making the exchange illustrated in FIG. 5, the information processing apparatus 401 on the transmitting side can grasp the size of the BA bitmap usable by the information processing apparatus 402 on the receiving side.

In this manner, in a case where the size of the BA bitmap usable by the information processing apparatus 402 on the receiving side is grasped, the information processing apparatus 401 on the transmitting side saves a value within the range of the size of this usable BA bitmap in the requested Bitmap Size 472 to transmit.

Meanwhile, it is also supposed that the information processing apparatus 401 on the transmitting side does not grasp the size of the BA bitmap usable by the information processing apparatus 402 on the receiving side. In this case, similarly to the example illustrated in FIG. 5, the information processing apparatus 401 on the transmitting side determines the size of the BA bitmap to be requested to the information processing apparatus 402 on the receiving side. Then, the information processing apparatus 401 on the transmitting side saves that determined size of the BA bitmap in the requested Bitmap Size 472 to transmit. In this case, the information processing apparatus 401 on the transmitting side can grasp the size of the BA bitmap usable by the information processing apparatus 402 on the receiving side on the basis of the information included in a Block ACK 475 from the information processing apparatus 402 on the receiving side.

In addition, the information processing apparatus 402 on the receiving side transmits the Block ACK 475 for the data frame 470 to the information processing apparatus 401 on the transmitting side. In this case, the information processing apparatus 402 on the receiving side transmits the Block ACK 475 on the basis of the Starting Sequence Number 471 and the requested Bitmap Size 472 included in the received data frame 470.

For example, the information processing apparatus 401 on the transmitting side can request a large size of the BA bitmap in a case where the traffic load of an application is high in the own apparatus. Meanwhile, the information processing apparatus 401 on the transmitting side can request a small size of the BA bitmap in a case where the traffic load of an application is low in the own apparatus. With this configuration, an appropriate BA bitmap can be obtained.

[Another Example of Dynamically Determining Size of BA Bitmap]

FIG. 10 is a diagram illustrating an example of a case of determining the size of the BA bitmap using the data frame exchanged between the information processing apparatuses according to the embodiment of the present technology. That is, FIG. 10 illustrates an example of transmitting information for determining the size of the BA bitmap as additional information on the BAR such that the size of the BA bitmap is exchanged dynamically during data communication.

For example, the information processing apparatus 401 on the transmitting side transmits a data frame 480 to the information processing apparatus 402 on the receiving side. Subsequently, the information processing apparatus 401 on the transmitting side includes a Starting Sequence Number 491 and a requested Bitmap Size 492 into a BAR 490 to transmit to the information processing apparatus 402 on the receiving side.

Here, similarly to the example illustrated in FIG. 9, it is also supposed that the information processing apparatus 401 on the transmitting side grasps the size of the BA bitmap usable by the information processing apparatus 402 on the receiving side. In this case, the information processing apparatus 401 on the transmitting side saves a value within the range of that usable size of the BA bitmap in the requested Bitmap Size 492 to transmit. Meanwhile, a case is also supposed in which the size of the BA bitmap usable by the information processing apparatus 402 on the receiving side is not grasped. In this case, the information processing apparatus 401 on the transmitting side first grasps the size of the BA bitmap usable by the information processing apparatus 402 on the receiving side. Then, after that, the information processing apparatus 401 on the transmitting side saves a value within the range of that usable size of the BA bitmap in the requested Bitmap Size 492 to transmit.

In addition, the information processing apparatus 402 on the receiving side transmits a Block ACK 495 for the data frame 480 to the information processing apparatus 401 on the transmitting side. In this case, the information processing apparatus 402 on the receiving side transmits the Block ACK 495 on the basis of the Starting Sequence Number 491 and the requested Bitmap Size 492 included in the received BAR 490.

In addition, similarly to the example illustrated in FIG. 9, for example, the information processing apparatus 401 on the transmitting side can request the size of the BA bitmap in accordance with the traffic load of an application in the own apparatus. With this configuration, an appropriate BA bitmap can be obtained.

[Example of Action of Information Processing Apparatus on Transmitting Side]

Figure 11:
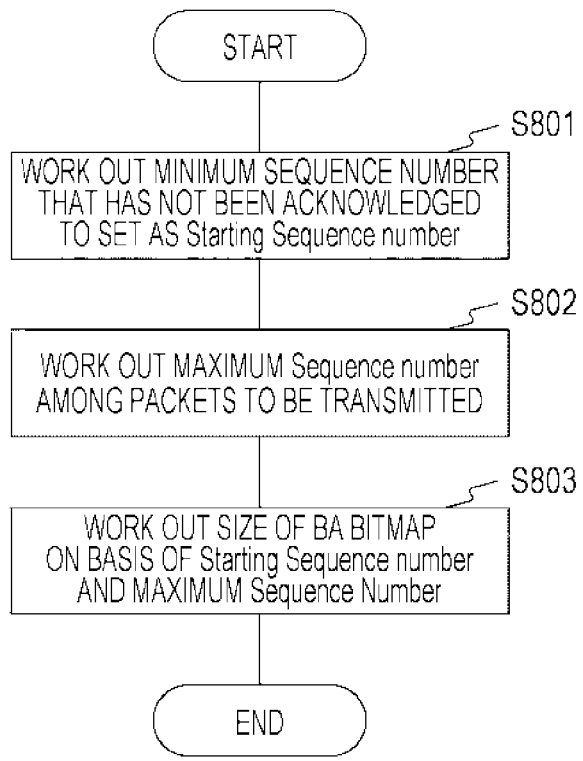
FIG. 11 is a flowchart illustrating an example of a process procedure of a determination process of determining the size of the BA bitmap requested by the information processing apparatus 100 according to the embodiment of the present technology.

FIG. 11 is a flowchart illustrating an example of a process procedure of a determination process of determining the size of the BA bitmap requested by the information processing apparatus 100 according to the embodiment of the present technology. That is, FIG. 11 illustrates an example of the action in a case where the information processing apparatus 100 acts as an appliance on the transmitting side. This process procedure can be performed, for example, just before data transmission each time data is transmitted.

First, the control unit 160 of the information processing apparatus 100 works out the minimum sequence number (sequence numeral) whose ACK has not been notified from the information processing apparatus on the receiving side among the packets to be transmitted (step S801). Then, the control unit 160 sets the minimum sequence number worked out above as a Starting Sequence Number (step S801).

Subsequently, the control unit 160 works out the maximum sequence number (maximum Sequence Number) among the packets to be transmitted (step S802).

Subsequently, the control unit 160 determines the size of the BA bitmap to be requested to an appliance on the receiving side on the basis of the set Starting Sequence Number and the maximum sequence number worked out (step S803).

For example, the control unit 160 can work out a size BMS 1 of the BA bitmap to be requested to the appliance on the receiving side using the following expression.

$$BMS\ 1 = \text{round}((\text{maximum Sequence Number} - \text{Starting Sequence Number} + 1)/8)$$

Here, round represents round-up at the decimal point. In addition, since one byte includes eight bits (minimum octet), the value of the packet to be transmitted is divided by eight in Expression 1. Note that steps S801 to S803 are an example of a control procedure described in the claims.

In this manner, the control unit 160 can control to determine the information amount (for example, the size of the BA bitmap) to be used for the receipt acknowledgment response (for example, the BA) to the packets to be transmitted on the basis of the information relating to these packets. This example illustrates a case where the information relating to the packets to be transmitted is designated as the maximum Sequence Number and the Starting Sequence Number. Note that the information relating to the packets to be transmitted can be designated as, for example, the number of the packets to be transmitted or a length from a start sequence numeral to an end sequence numeral among sequence numerals corresponding to the packets to be transmitted. In addition, the packets to be transmitted can be designated as packets which have not been successfully transmitted to an appliance as the transmission destination of these packets.

In addition, the control unit 160 notifies the appliance as the transmission destination of the packets of that determined information amount (for example, the size of the BA bitmap). In this case, the control unit 160 can include that determined information amount into a predetermined frame to transmit. The predetermined frame can be designated as one of, for example, the ADDBA Request 410 (illustrated in FIG. 5), the data frame 470 (illustrated in FIG. 9), the Block ACK Request 490 (illustrated in FIG. 10), and aggregated frames. For example, in a case where that determined information amount is included into the aggregated frame and transmitted, the control unit 160 can include the information amount into at least a part of the aggregated frames to transmit. Here, an existing frame defined in IEEE 802.11 or a newly defined frame may be adopted as a frame in which that determined information amount is saved (a part of the aggregated frames). With this configuration, for example, even in a case where the frame in which that determined information amount is saved is aggregated with the data frame or another frame, that determined information amount (for example, the size of the BA bitmap) can be notified to the appliance as the transmission destination of the packets.

In addition, in a case where an information amount different from that determined information amount (for example, the size of the BA bitmap) is notified from the appliance as the transmission destination after notifying this information amount, the control unit 160 newly determines this different information amount as the information amount to be used for the receipt acknowledgment response.

In addition, the control unit 160 can control to concatenate packets in agreement with the determined information amount (for example, the size of the BA bitmap) among the packets to be transmitted and transmit the concatenated packets to the appliance as the transmission destination.

In addition, as illustrated in FIGS. 9 and 10, for example, the control unit 160 may determine the information amount for packets each time the packets are transmitted to the appliance as the transmission destination and notify the appliance as the transmission destination of this determined information amount.

In addition, similarly to the examples illustrated in FIGS. 9 and 10, in a case where the traffic load of an application is high in the information processing apparatus 100, a larger size of the BA bitmap with a threshold value as a reference may be determined.

Meanwhile, in a case where the traffic load of an application is low in the information processing apparatus 100, a smaller size of the BA bitmap with the threshold value as a reference may be determined. In addition, a plurality of threshold values may be used as the threshold value. In addition, the size of the BA bitmap may be determined in accordance with an application being used and the communication environment of the information processing apparatus 100 (for example, the degree of congestion and the number of connected appliances). That is, the control unit 160 may control to determine the size of the BA bitmap on the basis of the traffic load of an application in the information processing apparatus 100. In addition, the control unit 160 may control to determine the size of the BA bitmap on the basis of the type of an application being used. In addition, the control unit 160 may control to determine the size of the BA bitmap on the basis of the communication environment of the information processing apparatus 100 (for example, the degree of congestion and the number of connected appliances).

[Example of Action of Information Processing Apparatus on Receiving Side]

Figure 12:
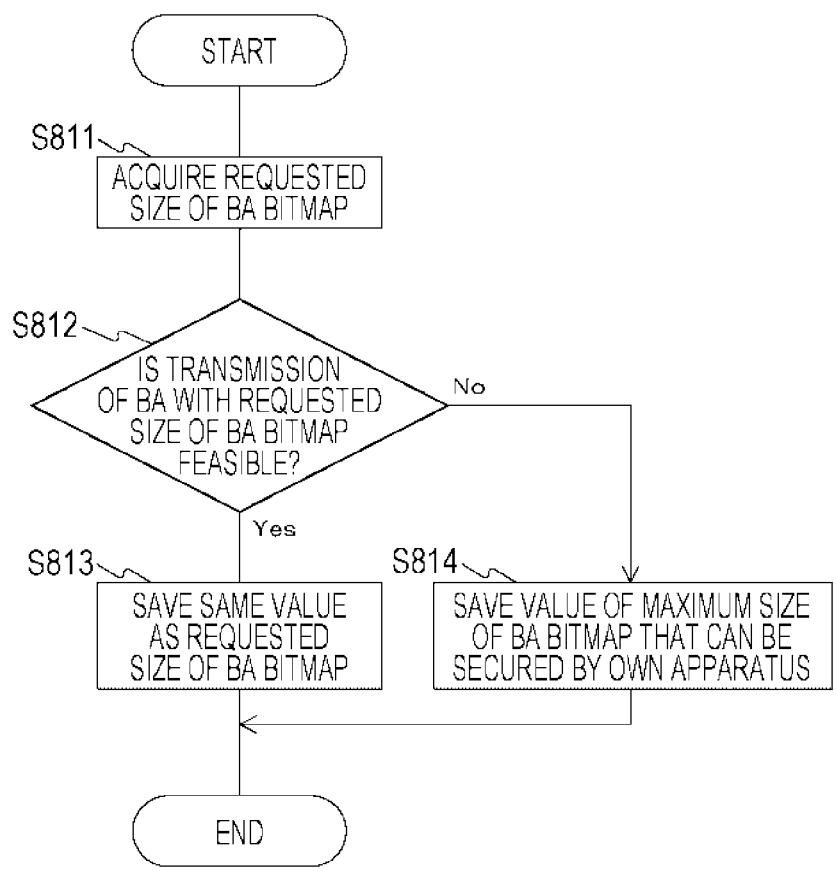
FIG. 12 is a flowchart illustrating an example of a process procedure of a determination process of determining the size of the BA bitmap to be used for a return by the information processing apparatus 100 according to the embodiment of the present technology.

FIG. 12 is a flowchart illustrating an example of a process procedure of a determination process of determining the size of the BA bitmap to be used for a return by the information processing apparatus 100 according to the embodiment of the present technology. That is, FIG. 12 illustrates an example of the action in a case where the information processing apparatus 100 acts as an appliance on the receiving side. This process procedure can be performed, for example, each time data is received.

First, the control unit 160 of the information processing apparatus 100 acquires the size of the BA bitmap requested from an appliance on the transmitting side (step S811). For example, the control unit 160 acquires a requested Bitmap Size (for example, the requested Bitmap Size 412 illustrated in FIG. 5) included in a received frame.

Subsequently, the control unit 160 judges whether transmission of the BA (transmission from the own apparatus) with the size of the BA bitmap requested from the appliance on the transmitting side is feasible (step S812).

In a case where transmission of the BA with the requested size of the BA bitmap is feasible (step S812), the control unit 160 transmits the same size as the size of the BA bitmap requested from the appliance on the transmitting side to the information processing apparatus on the transmitting side (step S813). For example, the control unit 160 saves the same size as the size of the BA bitmap requested from the appliance on the transmitting side in a usable Bitmap Size (for example, the used Bitmap Size 422 illustrated in FIG. 5) of the frame to transmit to the information processing apparatus on the transmitting side.

In a case where transmission of the BA with the requested size of the BA bitmap is not feasible (step S812), the control unit 160 transmits the value of the maximum size of the bitmap that can be secured by the own apparatus to the information processing apparatus on the transmitting side (step S814). For example, the control unit 160 saves the value of the maximum bitmap size that can be secured by the own apparatus in a usable Bitmap Size (for example, the used Bitmap Size 422 illustrated in FIG. 5) of the frame to transmit to the information processing apparatus on the transmitting side.

As described above, the control unit 160 controls to determine the information amount to be used for the receipt acknowledgment response to the packets transmitted from the appliance on the transmitting side of the packets on the basis of the information amount notified from this appliance (the information amount to be used for the receipt acknowledgment response to the packets). Then, the control unit 160 controls to return the receipt acknowledgment response to the packets transmitted from the appliance on the transmitting side to the appliance on the transmitting side on the basis of that determined information amount. In this case, in a case where the information amount notified from the appliance on the transmitting side exceeds the performance of the information processing apparatus 100 related to wireless communication, the control unit 160 determines an information amount different from the information amount notified from the appliance on the transmitting side within the range of that performance. Then, the control unit 160 notifies the appliance on the transmitting side of that determined information amount.

[Example of Action of Information Processing Apparatus on Receiving Side]

Figure 13:
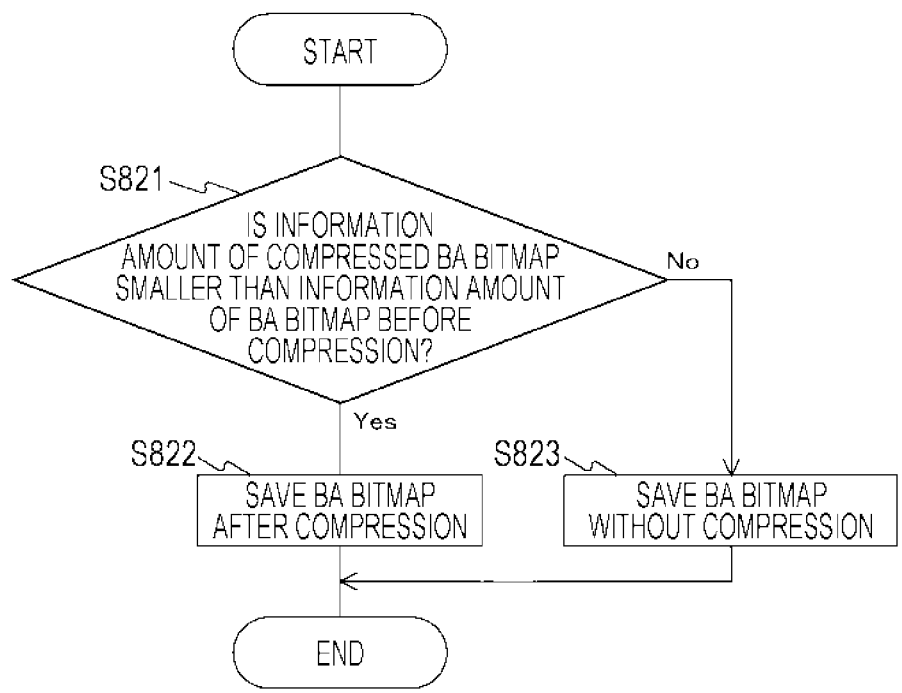
FIG. 13 is a flowchart illustrating an example of a process procedure of a determination process of determining whether the information processing apparatus 100 according to the embodiment of the present technology compresses the BA bitmap to transmit.

FIG. 13 is a flowchart illustrating an example of a process procedure of a determination process of determining whether the information processing apparatus 100 according to the embodiment of the present technology compresses the BA bitmap to transmit. That is, FIG. 13 illustrates an example of the action in a case where the information processing apparatus 100 acts as an appliance on the receiving side. This process procedure can be performed, for example, each time data is transmitted.

First, the control unit 160 of the information processing apparatus 100 compares the information amount of the BA bitmap (the information amount of the BA bitmap before compression) with the information amount in the case of compressing the BA bitmap (the information amount of the compressed BA bitmap) (step S821).

In a case where the information amount of the compressed BA bitmap is smaller than the information amount of the BA bitmap before compression (step S821), the control unit 160 saves information in which the BA bitmap is compressed in a frame and transmits the information to an appliance on the transmitting side (step S822). For example, the BA bitmap can be compressed and saved in a frame as illustrated in FIGS. 6 and 8.

In a case where the information amount of the compressed BA bitmap is not smaller than the information amount of the BA bitmap before compression (step S821), the control unit 160 saves the BA bitmap in a frame without compressing the BA bitmap to transmit to the appliance on the transmitting side (step S823).

As described above, in a case where the receipt acknowledgment response (for example, the BA) to the received packets is to be transmitted, the control unit 160 can control to compress the receipt acknowledgment request to transmit on the basis of the information amount to be used for that receipt acknowledgment response (for example, the size of the BA bitmap). In this case, in a case where that compressed receipt acknowledgment response is received from the information processing apparatus 100, the appliance as the transmission source can acquire the contents of the compressed receipt acknowledgment response that has been received on the basis of the information amount determined by the own apparatus.

Here, as described earlier, in the current IEEE 802.11 specifications, the size of the BA bitmap is a fixed value of 64 bits. Therefore, for example, even if the traffic load is high and a transmission request for 64 packets or more occurs during a certain time, there are cases where the transmission of the next packet is blocked until the first 64 packets are deemed to be successfully transmitted. In addition, even in a case where the traffic load is low and only 64 or fewer packets are communicated during a certain time, unnecessary information will be transmitted. Accordingly, the embodiment of the present technology provides a protocol that can dynamically determine the BA bitmap.

As described thus far, according to the embodiment of the present technology, it is possible to realize a protocol for determining the size of the BA bitmap. In addition, a compressed bitmap can be transmitted.

Furthermore, according to the embodiment of the present technology, it is possible to appropriately set the size of the bitmap of the ACK. With this configuration, the efficiency of wireless communication can be enhanced and the transmission time of the ACK can be optimized.

2. APPLICATION EXAMPLES

The technology according to the present disclosure can be applied to a variety of products. For example, the information processing apparatuses 100, 401, and 402 may be realized as mobile terminals such as smartphones, tablet personal computers (PCs), note PCs, portable game terminals, or digital cameras, fixed terminals such as television receivers, printers, digital scanners, or network storages, or in-vehicle terminals such as car navigation apparatuses. In addition, the information processing apparatuses 100, 401, and 402 may be realized as terminals that perform machine-to-machine (M2M) communication (also referred to as machine type communication (MTC) terminals), such as smart meters, vending machines, remote monitoring apparatuses, or point-of-sale (POS) terminals. Furthermore, the information processing apparatuses 100, 401, and 402 may be wireless communication modules (for example, integrated circuit modules constituted by single dies) mounted on these terminals.

Meanwhile, for example, the information processing apparatuses 100, 401, and 402 may be realized as wireless LAN access points (also referred to as wireless base stations) that have a router function or do not have a router function. In addition, the information processing apparatuses 100, 401, and 402 may be realized as mobile wireless LAN routers. Furthermore, the information processing apparatuses 100, 401, and 402 may be wireless communication modules (for example, integrated circuit modules constituted by single dies) mounted on these apparatuses.

2-1. First Application Example

Figure 14:
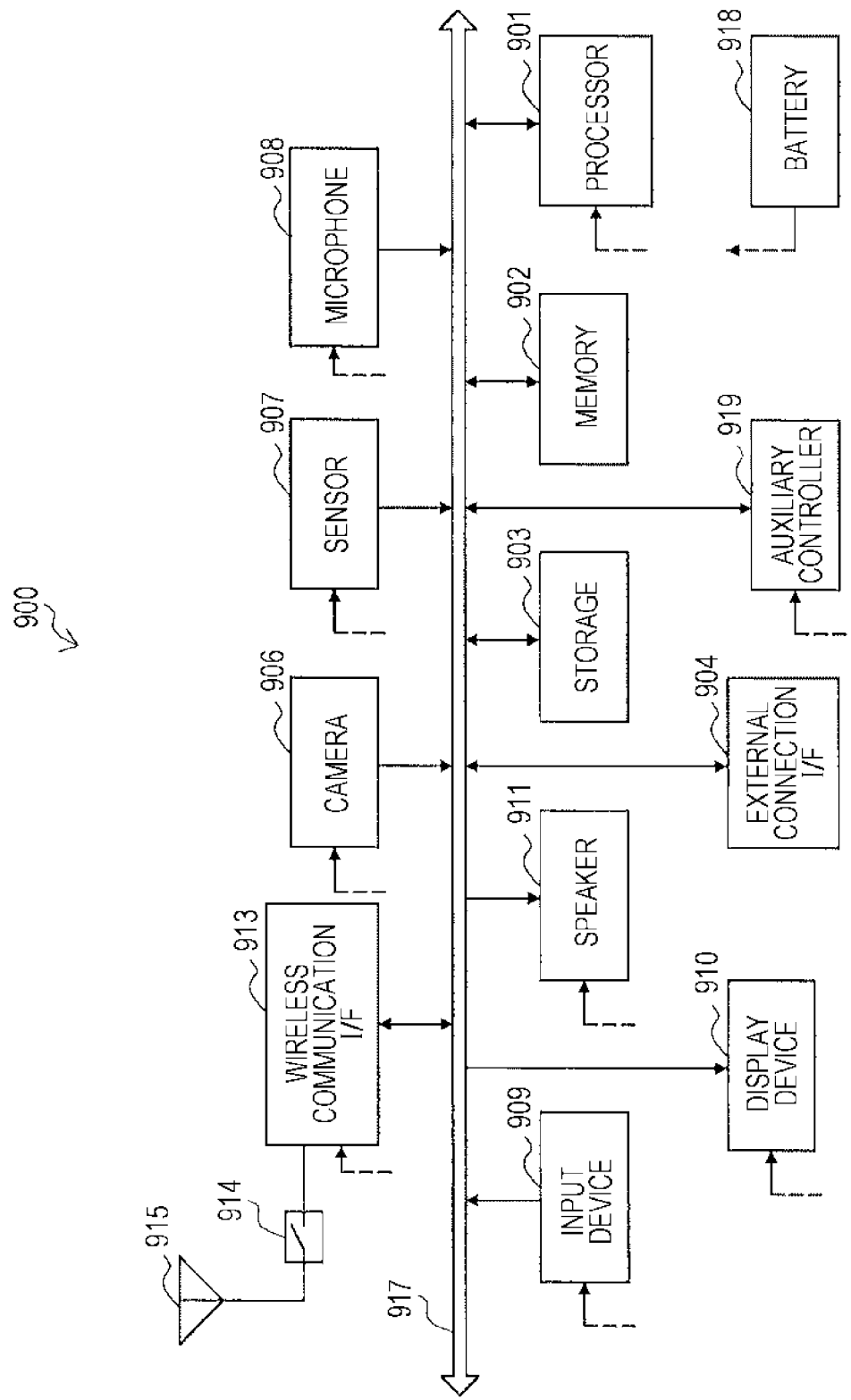
FIG. 14 is a block diagram illustrating an example of a schematic configuration of a smartphone.

FIG. 14 is a block diagram illustrating an example of a schematic configuration of a smartphone 900 to which the technology according to the present disclosure can be applied. The smartphone 900 is provided with a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system-on-chip (SoC) and controls functions of an application layer and other layers of the smartphone 900. The memory 902 includes a random access memory (RAM) and a read only memory (ROM) and stores programs and data to be executed by the processor 901. The storage 903 can include a storage medium such as a semiconductor memory or a hard disk. The external connection interface 904 is an interface for connecting an external device such as a memory card or a universal serial bus (USB) device to the smartphone 900.

The camera 906 has an image pickup element such as a charge coupled device (CCD) or a complementary metal oxide semiconductor (CMOS) and generates a picked-up image. The sensor 907 can include a group of sensors such as a positioning sensor, a gyro sensor, a geomagnetic sensor, and an acceleration sensor. The microphone 908 transforms audio input to the smartphone 900 into an audio signal. The input device 909 includes, for example, a touch sensor that detects a touch on a screen of the display device 910, a keypad, a keyboard, a button, or a switch and accepts an operation or information input from a user. The display device 910 has a screen such as a liquid crystal display (LCD) or an organic light emitting diode (OLED) display and displays an output image from the smartphone 900. The speaker 911 transforms an audio signal output from the smartphone 900 into audio.

The wireless communication interface 913 supports one or more of wireless LAN standards such as IEEE 802.11a, 11b, 11g, 11n, 11ac, and 11ad and executes wireless communication. In an infrastructure mode, the wireless communication interface 913 can communicate with another apparatus via a wireless LAN access point. Meanwhile, the wireless communication interface 913 can directly communicate with another apparatus in an ad hoc mode or a direct communication mode such as Wi-Fi Direct. Note that, in Wi-Fi Direct, one of two terminals acts as an access point unlike the ad hoc mode, but communication is performed directly between these terminals. Typically, the wireless communication interface 913 can include a baseband processor, a radio frequency (RF) circuit, a power amplifier, and the like. The wireless communication interface 913 may be a one-chip module in which a memory configured to store a communication control program, a processor configured to execute the program, and a relevant circuit are integrated. The wireless communication interface 913 may support other types of wireless communication techniques in addition to a wireless LAN technique, such as a short range wireless communication technique, a close proximity wireless communication technique, and a cellular communication technique. The antenna switch 914 switches a connection destination of the antenna 915 among a plurality of circuits (for example, circuits for different wireless communication techniques) included in the wireless communication interface 913. The antenna 915 has a single antenna element or a plurality of antenna elements (for example, a plurality of antenna elements constituting a multiple-input multipleoutput (MIMO) antenna) and is used by the wireless communication interface 913 to transmit and receive a wireless signal.

Note that the smartphone 900 is not limited to the example in FIG. 14 and may be provided with a plurality of antennas (for example, an antenna for the wireless LAN and an antenna for the close proximity wireless communication technique). In that case, the antenna switch 914 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to each block of the smartphone 900 illustrated in FIG. 14 via a power supply line partially indicated by broken lines in FIG. 14. The auxiliary controller 919 causes minimum necessary functions of the smartphone 900 to act, for example, during a sleep mode.

In the smartphone 900 illustrated in FIG. 14, the control unit 160 described with reference to FIG. 1 may be implemented in the wireless communication interface 913. In addition, at least a part of the functions thereof may be implemented in the processor 901 or the auxiliary controller 919. For example, by determining the BA bitmap in the smartphone 900, the power consumption of the battery 918 can be lowered.

Note that the smartphone 900 may act as a wireless access point (software AP) using the processor 901 executing an access point function at an application level. In addition, the wireless communication interface 913 may have a wireless access point function.

2-2. Second Application Example

Figure 15:
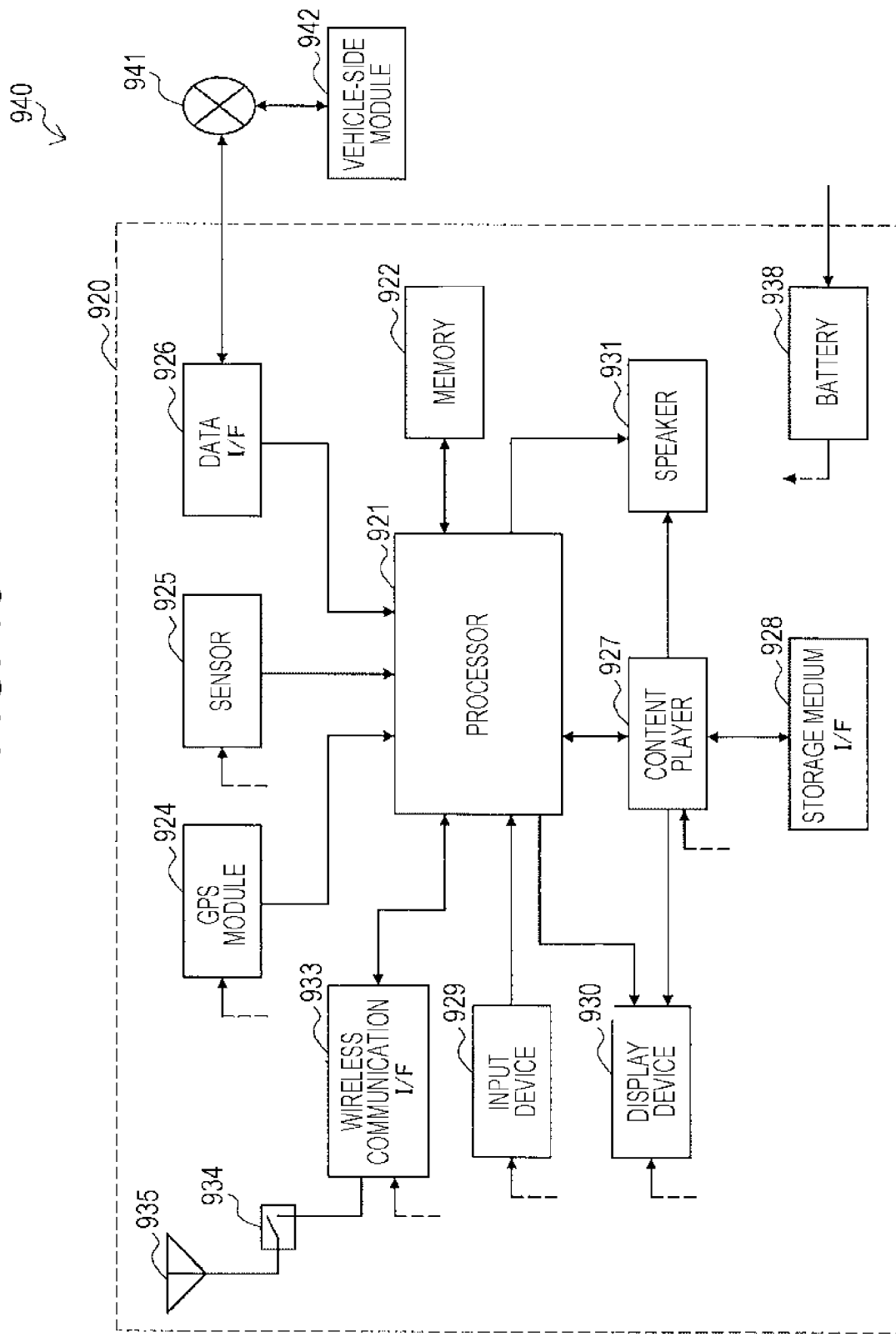
FIG. 15 is a block diagram illustrating an example of a schematic configuration of a car navigation apparatus.

FIG. 15 is a block diagram illustrating an example of a schematic configuration of a car navigation apparatus 920 to which the technology according to the present disclosure can be applied. The car navigation apparatus 920 is provided with a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC and controls a navigation function and other functions of the car navigation apparatus 920. The memory 922 includes a RAM and a ROM and stores programs and data to be executed by the processor 921.

The GPS module 924 measures the position (for example, latitude, longitude, and altitude) of the car navigation apparatus 920 using a GPS signal received from a GPS satellite. The sensor 925 can include a group of sensors such as a gyro sensor, a geomagnetic sensor, and a barometric sensor. The data interface 926 is connected, for example, to an in-vehicle network 941 via a port not illustrated and acquires data generated by a vehicle, such as vehicle speed data.

The content player 927 reproduces content stored in a storage medium (for example, a CD or a DVD) inserted in the storage medium interface 928. The input device 929 includes, for example, a touch sensor that detects a touch on a screen of the display device 930, a button, or a switch and accepts an operation or information input from a user. The display device 930 has a screen such as an LCD or an OLED display and displays the navigation function or an image of the content being reproduced. The speaker 931 outputs audio of the navigation function or the content being reproduced.

The wireless communication interface 933 supports one or more of wireless LAN standards such as IEEE 802.11a, 11b, 11g, 11n, 11ac, and 11ad and executes wireless communication. In the infrastructure mode, the wireless communication interface 933 can communicate with another apparatus via a wireless LAN access point. Meanwhile, the wireless communication interface 933 can directly communicate with another apparatus in the ad hoc mode or the direct communication mode such as Wi-Fi Direct. Typically, the wireless communication interface 933 can include a baseband processor, an RF circuit, a power amplifier, and the like. The wireless communication interface 933 may be a one-chip module in which a memory configured to store a communication control program, a processor configured to execute the program, and a relevant circuit are integrated. The wireless communication interface 933 may support other types of wireless communication techniques in addition to the wireless LAN technique, such as the short range wireless communication technique, the close proximity wireless communication technique, and the cellular communication technique. The antenna switch 934 switches a connection destination of the antenna 935 among a plurality of circuits included in the wireless communication interface 933. The antenna 935 has a single antenna element or a plurality of antenna elements and is used by the wireless communication interface 933 to transmit and receive a wireless signal.

Note that the car navigation apparatus 920 is not limited to the example in FIG. 15 and may be provided with a plurality of antennas. In that case, the antenna switch 934 may be omitted from the configuration of the car navigation apparatus 920.

The battery 938 supplies power to each block of the car navigation apparatus 920 illustrated in FIG. 15 via a power supply line partially indicated by broken lines in FIG. 15. In addition, the battery 938 accumulates power supplied from the vehicle.

In the car navigation apparatus 920 illustrated in FIG. 15, the control unit 160 described with reference to FIG. 1 may be implemented in the wireless communication interface 933. In addition, at least a part of the functions thereof may be implemented in the processor 921. For example, by determining the BA bitmap in the car navigation apparatus 920, the power consumption of the battery 938 can be lowered.

Furthermore, the wireless communication interface 933 may act as the above-described information processing apparatuses 100, 401, and 402 so as to provide a wireless connection to a terminal carried by a user riding in the vehicle.

Additionally, the technology according to the present disclosure may be realized as an in-vehicle system (or vehicle) 940 including one or more blocks of the car navigation apparatus 920 described above, the in-vehicle network 941, and a vehicle-side module 942. The vehicle-side module 942 generates vehicle-side data such as vehicle speed, engine speed, or failure information and outputs the generated data to the in-vehicle network 941.

2-3. Third Application Example

Figure 16:
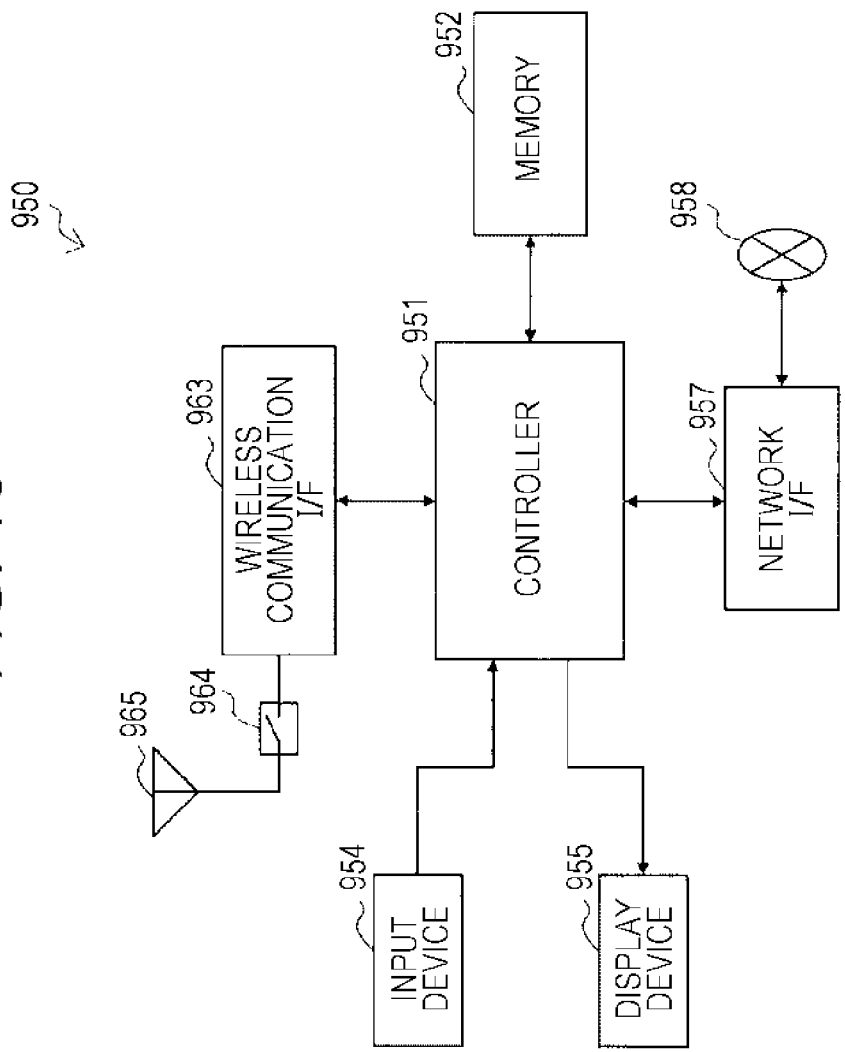
FIG. 16 is a block diagram illustrating an example of a schematic configuration of a wireless access point.

FIG. 16 is a block diagram illustrating an example of a schematic configuration of a wireless access point 950 to which the technology according to the present disclosure can be applied. The wireless access point 950 is provided with a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and causes a variety of functions of an Internet protocol (IP) layer and upper layers of the wireless access point 950 (for example, access restriction, routing, encryption, firewall, and log management) to act. The memory 952 includes a RAM and a ROM and stores a program to be executed by the controller 951 and a variety of types of control data (for example, a terminal list, a routing table, an encryption key, a security setting, and a log).

The input device 954 includes, for example, a button or a switch and accepts an operation from a user. The display device 955 includes an LED lamp and the like and displays the action status of the wireless access point 950.

The network interface 957 is a wired communication interface for the wireless access point 950 to connect to a wired communication network 958. The network interface 957 may have a plurality of connection ports. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad and provides a wireless connection to a neighboring terminal as an access point. Typically, the wireless communication interface 963 can include a baseband processor, an RF circuit, a power amplifier, and the like. The wireless communication interface 963 may be a one-chip module in which a memory configured to store a communication control program, a processor configured to execute the program, and a relevant circuit are integrated. The antenna switch 964 switches a connection destination of the antenna 965 among a plurality of circuits included in the wireless communication interface 963. The antenna 965 has a single antenna element or a plurality of antenna elements and is used by the wireless communication interface 963 to transmit and receive a wireless signal.

In the wireless access point 950 illustrated in FIG. 16, the control unit 160 described with reference to FIG. 1 may be implemented in the wireless communication interface 963. In addition, at least a part of the functions thereof may be implemented in the controller 951. For example, by determining the BA bitmap in the wireless access point 950, the efficiency of wireless communication can be improved.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

In addition, the process procedures described in the above embodiments may be regarded as a method having these series of procedures and additionally, may be regarded as a program for causing a computer to execute these series of procedures or as a recording medium storing the program. As this recording medium, for example, a compact disc (CD), a mini disc (MD), a digital versatile disc (DVD), a memory card, or a Blu-ray (registered trademark) disc can be used.

Note that the effects described in the present description merely serve as examples and not construed to be limited. There may be another effect as well.

Note that the present technology can be also configured as described below.

(1)

An information processing apparatus including a control unit that controls to determine an information amount to be used for a receipt acknowledgment response to packets to be transmitted on the basis of information relating to the packets.

(2)

The information processing apparatus according to (1) above, in which the information relating to the packets to be transmitted is the number of the packets to be transmitted or a length from a start sequence numeral to an end sequence numeral among sequence numerals corresponding to the packets to be transmitted.

(3)

The information processing apparatus according to (1) or (2) above, in which the packets to be transmitted are packets that have not been successfully transmitted to an appliance as a transmission destination of the packets.

(4)

The information processing apparatus according to any one of (1) to (3) above, in which the control unit controls to concatenate packets in agreement with the determined information amount among the packets to be transmitted and transmit the concatenated packets to an appliance as a transmission destination.

(5)

The information processing apparatus according to any one of (1) to (4) above, in which the control unit controls to concatenate the packets to be transmitted and transmit the concatenated packets to an appliance as a transmission destination, while determining a size of a bitmap of a Block ACK to be returned to the information processing apparatus by the appliance as the information amount.

(6)

The information processing apparatus according to any one of (1) to (5) above, in which the control unit notifies an appliance as a transmission destination of the packets of the determined information amount.

(7)

The information processing apparatus according to (6) above, in which the control unit includes the determined information amount into a predetermined frame to transmit to the appliance.

(8)

The information processing apparatus according to (6) or (7) above, in which the control unit includes the determined information amount into one of an ADDBA Request, a data frame, a Block ACK Request, and at least one of a plurality of frames in a concatenated frame in which the plurality of frames are concatenated, to transmit to the appliance.

(9)

The information processing apparatus according to any one of (6) to (8) above, in which, in a case where an information amount different from the information amount is notified from the appliance after notifying the information amount, the control unit newly determines the different information amount as the information amount to be used for the receipt acknowledgment response.

(10)

The information processing apparatus according to any one of (1) to (9) above, in which the control unit controls to determine the information amount for the packets each time the packets are transmitted to an appliance as a transmission destination and notify the appliance of the determined information amount.

(11)

The information processing apparatus according to any one of (1) to (10) above, in which the control unit determines the information amount to be used when an appliance as a transmission destination of the packets returns the receipt acknowledgment response.

(12)

The information processing apparatus according to (11) above, in which, in a case where the receipt acknowledgment response that is compressed is received from the appliance, the control unit acquires contents of the compressed receipt acknowledgment response that has been received on the basis of the determined information amount.

(13)

An information processing apparatus including a control unit that controls to determine an information amount to be used for a receipt acknowledgment response to packets transmitted from an appliance as a transmission source of the packets on the basis of an information amount to be used for the receipt acknowledgment response to the packets notified from the appliance.

(14)

The information processing apparatus according to (13) above, in which, in a case where the information amount notified from the appliance exceeds performance of the information processing apparatus related to wireless communication, the control unit determines an information amount different from the information amount notified from the appliance within a range of the performance and notifies the appliance of the determined information amount.

(15)

An information processing apparatus including a control unit that controls to compress the receipt acknowledgment request to transmit on the basis of an information amount to be used for a receipt acknowledgment response in a case where the receipt acknowledgment response to received packets is to be transmitted.

(16)

A communication system including:

a first information processing apparatus that determines an information amount to be used for a receipt acknowledgment response to packets to be transmitted to a second information processing apparatus on the basis of information relating to the packets and notifies the second information processing apparatus of the determined information amount; and the second information processing apparatus that returns the receipt acknowledgment response to the packets transmitted from the first information processing apparatus to the first information processing apparatus on the basis of the information amount notified from the first information processing apparatus.

(17)

An information processing method including a control procedure of determining an information amount to be used for a receipt acknowledgment response to packets to be transmitted on the basis of information relating to the packets.

(18)

A program for causing a computer to execute a control procedure of determining an information amount to be used for a receipt acknowledgment response to packets to be transmitted on the basis of information relating to the packets.

REFERENCE SIGNS LIST 100, 401, 402 Information processing apparatus
110 Data processing unit
120 Signal processing unit
130 Wireless interface unit
140 Antenna
150 Storage unit
160 Control unit
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus comprising:
transmitting circuitry configured to transmit an ADDBA Request including first Block Ack size information indicating a first size to another information processing apparatus; and
receiving circuitry configured to receive an ADDBA Response including second Block Ack size information indicating a second size from the another information processing apparatus, the second size of the second Block Ack size information being equal to or less than the first size of the first Block Ack size information requested by the information processing apparatus, wherein the transmitting circuitry is configured to transmit, after exchanging the ADDBA Request and the ADDBA Response, a data frame to the another information processing apparatus, and wherein the receiving circuitry is configured to receive a Block Ack frame in response to the data frame, the Block Ack frame including third Block Ack size information indicating a third size and a Block Ack Bitmap of the third size; and control circuitry configured to determine the first size each time data related to the ADDBA Request is transmitted to the another information processing apparatus to notify the another information processing apparatus of the first size, wherein the first size is determined from 16, 32, 64, 128, 256, 512, 1024 or 2048 bits.

2. The information processing apparatus according to claim 1, wherein the first Block Ack size information is based on a total number of the packets included in the data frame to be transmitted or a length from a start sequence numeral to an end sequence numeral among sequence numerals corresponding to the packets.

3. The information processing apparatus according to claim 1, wherein the packets included in the data frame to be transmitted are packets that have not been successfully transmitted to the another information processing apparatus.

4. The information processing apparatus according to claim 1, further comprising control circuitry configured to concatenate packets in agreement with the first size among packets to be transmitted and transmit the concatenated packets in the data frame to the another information processing apparatus.

5. The information processing apparatus according to claim 1, further comprising control circuitry configured to concatenate packets to be transmitted and transmit the concatenated packets in the data frame to the another information processing apparatus, while determining a size of the Block Ack Bitmap as the first size.

6. The information processing apparatus according to claim 1, further comprising control circuitry configured to, in a case where the second size different from the first size is notified from another information processing apparatus after notifying the first size, the control circuitry newly determines the second size as the first size to be used for the Block Ack frame.

7. The information processing apparatus according to claim 1, further comprising control circuitry configured to determine the first size when the another information processing apparatus returns the Block Ack frame.

8. The information processing apparatus according to claim 7, wherein, in a case where the Block Ack frame that is compressed is received from the another information processing apparatus, the control circuitry is further configured to acquire contents of the compressed Block Ack frame that has been received on the basis of the third Block Ack size information.

9. An information processing apparatus comprising:

receiving circuitry configured to receive an ADDBA Request including first Block Ack size information indicating a first size from another information processing apparatus; and transmitting circuitry configured to transmit an ADDBA Response including second Block Ack size information indicating a second size to the another information processing apparatus, the second size of the second Block Ack size information being the same as or smaller than the first size of the first Block Ack size information requested by the information processing apparatus, wherein the receiving circuitry is configured to receive after exchanging the ADDBA Request and the ADDBA Response, a data frame from the another information processing apparatus, and wherein the transmitting circuitry is configured to transmit a Block Ack frame in response to the data frame, the Block Ack frame including third Block Ack size information indicating a third size and a Block Ack Bitmap of the third size; and the first size being determined by the another information processing apparatus each time data related to the ADDBA Request is transmitted from the another information processing apparatus to notify the information processing apparatus of the first size, wherein the first size is determined from 16, 32, 64, 128, 256, 512, 1024 or 2048 bits.

10. The information processing apparatus according to claim 9, further comprising control circuitry configured to, in a case where the first size notified from the another information processing apparatus exceeds performance of the information processing apparatus related to wireless communication, determine the second size different from the first size within a range of the performance and notify the another information processing apparatus of the second size.

11. The information processing apparatus according to claim 9, further comprising control circuitry configured to compress the Block Ack frame on the basis of the third size.

12. The information processing apparatus according to claim 9, wherein the first size is greater than 64 bits.

13. The information processing apparatus according to claim 1, wherein the first size is greater than 64 bits.

14. The information processing apparatus according to claim 9, wherein the first size is 16 bits.

15. The information processing apparatus according to claim 9, wherein the first size is 32 bits.

16. The information processing apparatus according to claim 1, wherein the first size is 16 bits.

17. The information processing apparatus according to claim 1, wherein the first size is 32 bits.

* * * * *